US005944873A

United States Patent [19]

Jager et al.

[11] Patent Number: 5,944,873

[45] Date of Patent: Aug. 31, 1999

[54] DEVICE FOR REMOVING ONE OR MORE UNDESIRABLE OR DANGEROUS SUBSTANCES FROM A GAS OR VAPOR MIXTURE AND A GAS MASK COMPRISING SUCH A DEVICE

[75] Inventors: Hein Jager, Nootdorp; Martin Jozef Van de Voorde, Oostburg, both of Netherlands

[73] Assignee: Nederlandse Organisatie Voor Toegepastnatuurwetenschappelijk Onderzoek TNO, Rijswijk, Netherlands

[21] Appl. No.: 08/956,604

[22] Filed: Oct. 23, 1997

[30] Foreign Application Priority Data

Oct. 23, 1996 [NL] Netherlands .......................... 1004343

[51] Int. Cl.[6] .................................................. B01D 53/04

[52] U.S. Cl. ................................ 95/25; 95/116; 95/141; 96/117.5; 96/153; 96/222; 96/417; 55/DIG. 33

[58] Field of Search ................................ 95/25, 90, 116, 95/117, 141, 143; 96/108, 117, 117.5, 153, 222, 417; 55/DIG. 33

[56] References Cited

U.S. PATENT DOCUMENTS

| | | | |
|---|---|---|---|
| 1,845,000 | 2/1932 | Wollin et al. | 96/117.5 X |
| 1,922,416 | 8/1933 | Block | 96/108 X |
| 2,575,234 | 11/1951 | Race, Jr. | 96/117.5 |
| 2,621,753 | 12/1952 | Urdahl | 96/117.5 |
| 3,902,485 | 9/1975 | Wallace | 96/117.5 X |
| 3,925,248 | 12/1975 | Moroni et al. | 96/153 X |
| 3,966,440 | 6/1976 | Roberts | 96/117.5 |
| 4,154,586 | 5/1979 | Jones et al. | 96/117.5 |
| 4,155,358 | 5/1979 | McAllister et al. | 96/117.5 X |
| 4,365,627 | 12/1982 | Wing | 96/117.5 X |
| 4,534,775 | 8/1985 | Frazier | 95/141 X |
| 4,604,110 | 8/1986 | Frazier | 95/141 X |
| 4,684,380 | 8/1987 | Leichnitz | 96/117.5 |
| 4,795,482 | 1/1989 | Gioffre et al. | 95/141 |
| 5,192,342 | 3/1993 | Baron et al. | 95/90 |
| 5,226,937 | 7/1993 | Linnersten et al. | 96/117.5 |
| 5,354,362 | 10/1994 | Sowinski | 95/141 X |

FOREIGN PATENT DOCUMENTS

| | | | |
|---|---|---|---|
| 0090563 | 10/1983 | European Pat. Off. . | |
| 0455173 | 11/1991 | European Pat. Off. . | |
| 0629437 | 12/1994 | European Pat. Off. . | |
| 0441826 | 7/1927 | Germany | 95/25 |
| 53-006289 | 1/1978 | Japan | 96/153 |
| 53-031566 | 3/1978 | Japan | 95/90 |

OTHER PUBLICATIONS

Derwent Abstract —JP60005973A, Jan. 12, 1985, 1 page.

*Primary Examiner*—Robert Spitzer
*Attorney, Agent, or Firm*—Webb Ziesenheim Logsdon Orkin & Hanson, P.C.

[57] ABSTRACT

The invention relates to a device for removing one or more undesirable or dangerous substances for the human race from a gas or vapour mixture, the device comprising: a predetermined amount of adsorbent for adsorbing the substances and an odourant for releasing an odour in order to alarm a person, wherein the odourant is arranged in such a manner that the odourant is displaceable by the substances, following a predetermined level of saturation of the adsorbent.

34 Claims, 26 Drawing Sheets

DEVICE FOR REMOVING ONE OR MORE UNDESIRABLE OR DANGEROUS SUBSTANCES FROM A GAS OR VAPOR MIXTURE AND A GAS MASK COMPRISING SUCH A DEVICE

BACKGROUND OF THE INVENTION

The present invention relates to a device for removing one or more undesirable substances or dangerous substances for humans from a gas or a vapor mixture, a gas mask filter, comprising such a device, a gas mask comprising such a filter and a method for warning of the presence of undesirable or dangerous substances.

Filters are used in order to remove dangerous substances from the air. Gas masks provided with filters are for example used for removing many sorts of poisonous components from air to be breathed.

In certain professions it is advisable to wear a gas mask. Furthermore, national laws increasingly require that the gas masks be worn for example in the building profession by painters and fitters who in their daily work in enclosed areas run a relatively large risk of coming into contact with dangerous chemicals. Gas masks are also worn in war situations.

The removal of undesirable or dangerous substances in vapor or gas form is presently, usually carried out in a gas mask filter by means of adsorption of these substances onto a layer of activated carbon. The more dangerous substances are adsorbed, the more the layer of activated carbon is saturated whereby the adsorption capacity of the filter decreases in time. The capacity of a filter is difficult to predict. The rate at which such filters are used up is an uncertain factor, since this is dependent on parameters such as the environmental temperature, the nature and concentration of the contaminants to be adsorbed and the rate and amount of breathing of the gas mask user. In practice the filters are seldom changed at the correct moment, i.e. the moment in time whereby adsorption in (substantially) no longer possible and as a consequence whereby dangerous substances begin to reach the user. When filters are changed too early, this leads to an unnecessary high usage thereof with the accompanying economic disadvantages, whilst changing a filter too late means that the user runs the risk of damage to the health.

It is an object of the present invention to substantially obviate one or more disadvantages of the state of the art, such as the above mentioned disadvantages, and/or to provide an improved use of a gas mask especially by providing an alarm with respect to the saturation level of the filter of a gas mask.

SUMMARY OF THE INVENTION

The present invention provides a device for removing one or more undesirable or dangerous substances for the human race from a gas or vapour mixture, said device comprising:

a predetermined amount of adsorbent for adsorbing the substances and an odourant for releasing an odour in order to alarm a person, wherein the odourant is arranged in such a manner that maid odourant is displaceable by the substances (adsorbates), following a predetermined level of saturation of the adsorbent.

Organic vapors and dangerous substances are accordingly removed from the environmental air by means of adsorption into the device. On coming into contact with the vapors/dangerous substances, the odourant is displaced such that the user smells the odourant.

The device is preferably provided with an odourant substrate, whereon the odour is loaded.

Since the odourant is itself loaded onto a substrate, displacement of the odourant by means of adsorption of the dangerous substances onto the substrate at the expense of the odourant is effected, whereby the odourant is actively displaced into the environment by the adsorbates.

The adsorbent for adsorbing the dangerous substances in preferably substantially unloaded in order to provide a good adsorbing capacity.

The density of the odourant substrate can differ from the density of the adsorbent. When the air resistance of the odourant substrate is chosen to be lower than the adsorbent, more air flows through the odourant substrate with respect to the adsorbent, than in comparison with a device wherein the adsorbent and the odourant substrate have the same densities such that the odourant is more rapidly displaced.

In the case wherein the odourant substrate has a greater density than the adsorbent, displacement of the odourant accordingly occurs at a slower rate.

The device according to the present invention can thus be made to meet the requirements of different users taking into consideration the displacement time whereby a certain degree of safety is built into the device.

The adsorbent and/or the odourant substrate are preferably substantially micro and/or macro and/or mesoporous in nature.

A microporous structure yields a good adsorbent capacity at a low relative pressure and displacement of the odourant is facilitated by means of the meso and macro-pores. The adsorbent and/or the odourant substrate is preferably substantially hydrophobic in nature. Accordingly, displacement of the odourant is not brought about by means of water vapor which could lead to a false indication of the consumption of the device.

In order to provide a consistent adsorption and desorption, the adsorbent and/or the odourant substrate are preferably homogenous.

The adsorbent and/or the odourant substrate preferably comprise activated carbon which is a very efficient adsorbent.

The activated carbon is preferably synthetic in order to be as homogenous as possible and the activated carbon is preferably chosen from the group consisting of R1 carbon (Norit), Saratoga carbons™ (Blücher) and ELC carbon™ (Norit), since these provide good results.

The odourant preferably has a characteristic smell and is substantially harmless to the health.

Furthermore the odourant preferably has a low odour barrier.

By odour it is meant that: the concentration of a substance in the air is such that 50% of people in the vicinity are able to smell the odour. Accordingly, a good perception of the odour at low concentrations thereof is ensured and the amount of the odourant substrate with respect to the adsorbent can be limited.

The odourant is preferably chemically inert in order to ensure that no chemical reaction takes place, which could possibly negatively affect the functioning of the device or the perception of the odour, and the odourant preferably has a boiling point of 100° C. or less, in order to provide a good displacement.

The odourant is crotonaldehyde, cyclohexane, butylamine, diisopropylamine, ethylidenenorborene, triethylamine, isoamylacetate, diisobutylketone, butylene, butylene cellosolveacetate, ethyl mercaptan, butyl mercaptan, ethylene mercaptan or methylcyclohexane. Preferably, the odourant is cyclohexane, isoamylacetate, butylene, butyl mercaptan, ethyl mercaptan or ethylene mercaptan, and most preferably is isoamylacetate.

Isoamylacetate is most preferred by way of its characteristic smell, low odour barrier and the fact that this is substantially harmless for humans.

The odourant can be loaded onto the substrate in the range of 0.01–0.5, preferably 0.1–0.4 and most preferably 0.2–0.3 grams of odourant per gram substrate in order to enable a good desorption of the odourant.

The odourant substrate is preferably provided with protection means in order to protect and shield odourant substrate from the adsorbent, wherein the protection means preferably comprises a tube of which both ends are open, positioned in the adsorbent, wherein the odourant substrate is arranged with this tube.

Accordingly, the influence of the adsorbent on the odourant substrate and vice versa is minimized. The ratio of the odourant substrate surface area to the surface area of the adsorbent lies in the range of 1:5000, preferably 1:1000, more preferably 1:100 and most preferably about 1:60.

On arranging the odourant substrate surface with respect to the adsorbent, the concentration of odourant in the effluent can be increased or decreased according to the desires of the user.

The odourant substrate which is arranged in the tubes of which both ends are open, can be arranged in a foam-like material, preferably an open foam, in order to provide an easy positioning of the tube within the device and furthermore to yield a good consistent air resistance.

According to another aspect of the present invention, there is provided a gas mask filter, comprising the above mentioned device.

According to another aspect of the present invention there is provided a gas mask, comprising such a gas mask filter.

The present invention furthermore relates to the use of the above device for removing one or more undesirable or dangerous substances for humans from a gas or vapour mixture, and for warning of the saturation level of the adsorbent by means of odour release.

Since there is no effective manner at the moment for warning gas mask users of the level of saturation of the gas mask filter, the gas mask filter according to the present invention solves this problem.

The invention furthermore relates to a device and use of this device, comprising a tube holder with an open end and a substrate loaded with an odourant for use in a gas mask filter and/or a gas mask. The odourant is crotonaldehyde, cyclohexane, butylamine, diisopropylamine, ethylidenenorborene, triethylamine, isoamylacetate, diisobutylketone, butylene, butylene cellosolveacetate, ethyl mercaptan, butyl mercaptan, ethylene mercaptan or methylcyclohexane. Preferably, the odourant is cyclohexane, isoamylacetate, butylene, butyl mercaptan, ethyl mercaptan or ethylene mercaptan, and most preferably is isoamylacetate.

Such a device can be arranged in existing gas masks in order to warn gas mask users of the level of saturation of the gas mask filters.

Other applications of a device according to the present invention include filters and air fresheners, for example bio-bins, toilets and the like.

The present invention will now be described by way of the following specific description, model calculations and experimental results, wherein reference is made to the accompanying figures, wherein:

DESCRIPTION OF THE PREFERRED EMBODIMENTS

Figure 1:
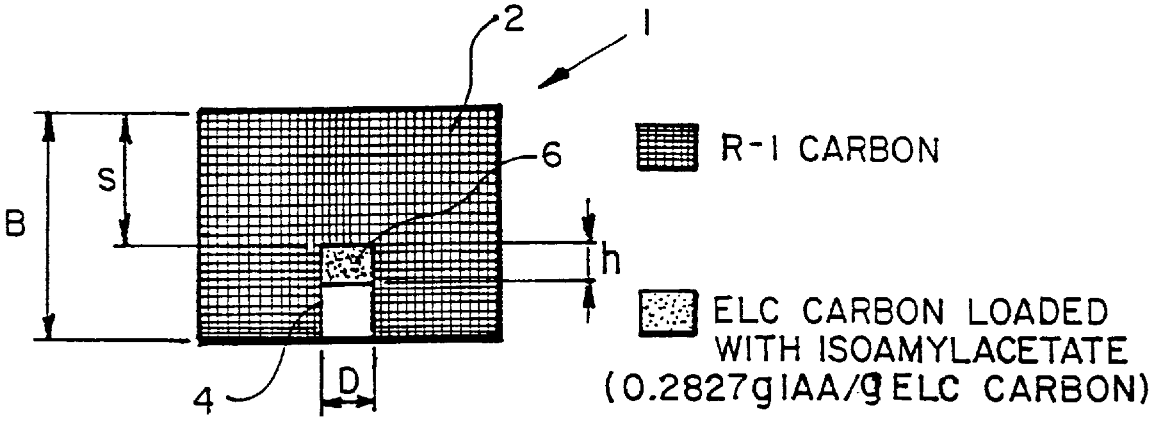
FIG. 1 shows a side view of a first device according to the present invention.

A device 1 (FIG. 1) consists of a layer of adsorbent 2, a tube 4 provided with an open end arranged in the layer 2, in which tube 4 a substrate 6 loaded with an odourant, the so called odourant substrate, is arranged.

Dimensions and characteristics of the device 1 are as follows:

| | | |
|---|---|---|
| Bed height (B) | 2 | cm |
| Diameter (D) of tube 4 | 0,6 | cm |
| Height of the odourant substrate (h) | 0,25 | cm |
| Height (S) of the adsorbent 2 above the odourant substrate 6 | 1,25 | cm |
| ELC carbon from the Norit Company was loaded with 0,2827 g isoamylacetate per gram ELC in order to provide the odourant substrate | | |

Figure 2:
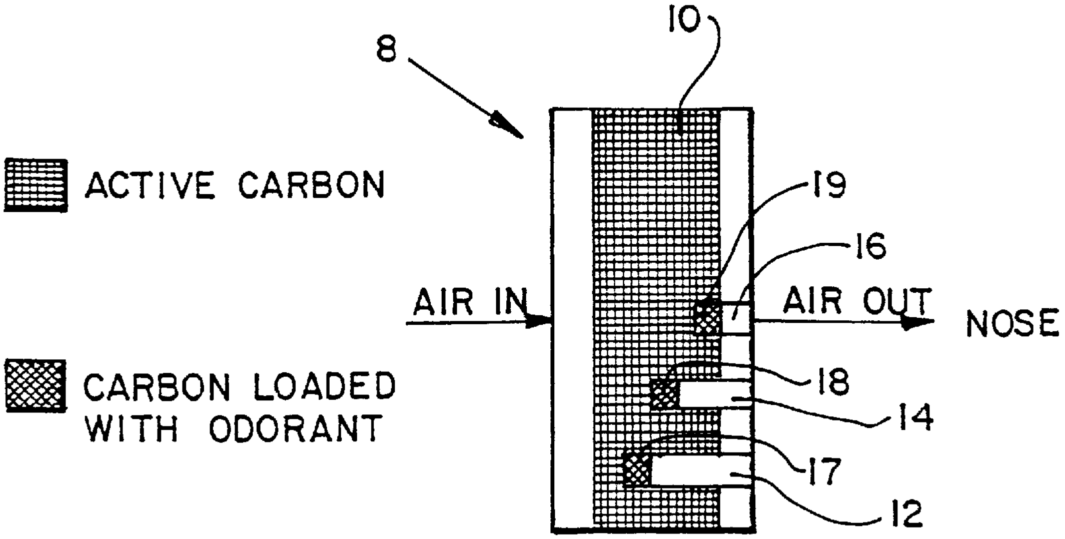
FIG. 2 shows a side view of a second device according to the present invention.

A second device 8 (FIG. 2) according to the present invention consists of a first layer of adsorbing carbon 10, three tubes 12, 14, 16 with open ends, which tubes are arranged in varying positions in the layer 10, and in which tubes activated coal layers 17, 19, 19 are arranged, wherein the layers of activated carbon are loaded with differing odourants.

Figure 26:
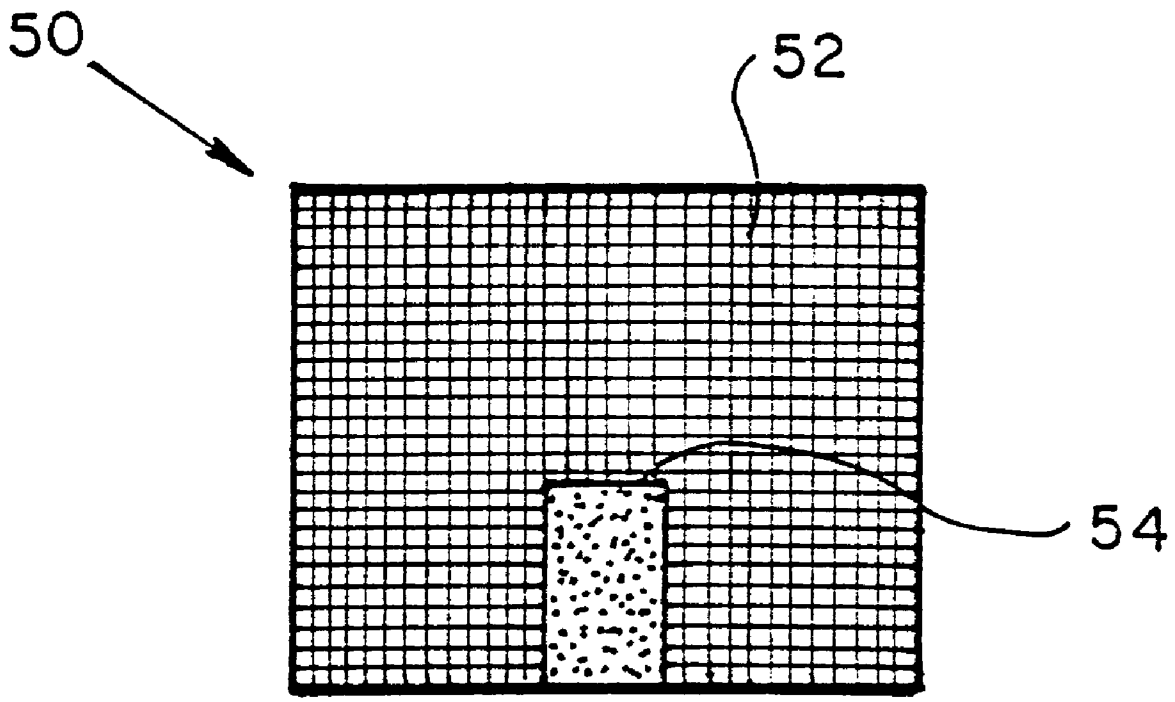
FIG. 26 shows a side view of a third device according to the present inveention.

A third device 50 (FIG. 26) according to the present invention, consists of a first layer of adsorbing carbon 52 and a layer of carbon 54 loaded with an odourant, which layer in arranged directly in the first layer 52.

This embodiment (50) provides an economic advantage with respect to the first two embodiments, since in this case, the odourant substrate is not arranged in a tube.

Figure 3:
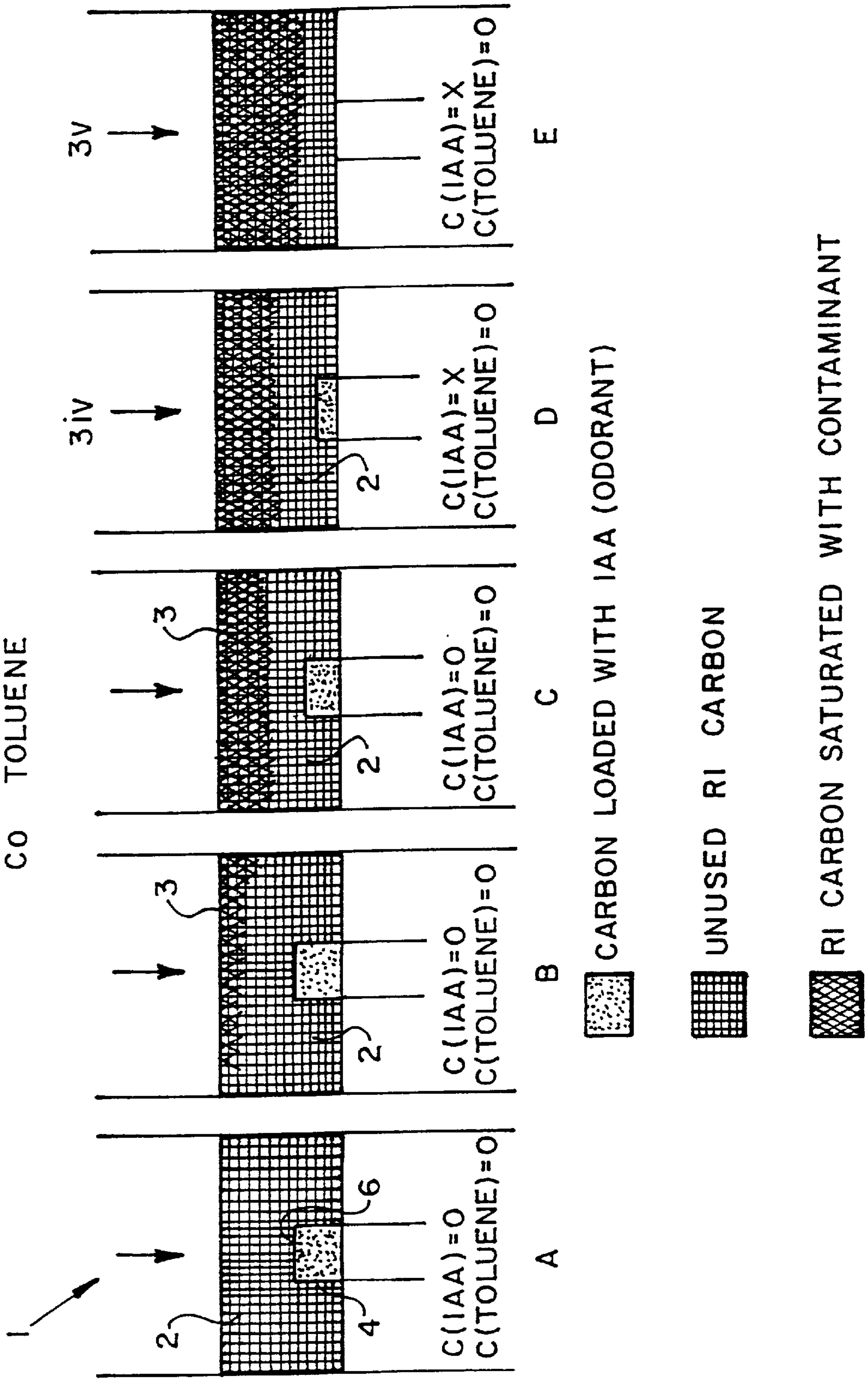
FIG. 3 shows a sequence wherein the device from FIG. 1 is shown, wherein subsequent levels of saturation are depicted.

FIG. 3 shows how the layer of adsorbent 2 becomes saturated in time as depicted by 3, 3*iv* and 3*v* until the mass displacement zone has reached the front side of the odourant substrate at which moment, the displacement process starts. At this point in time, odour can be released and detected.

Figure 4:
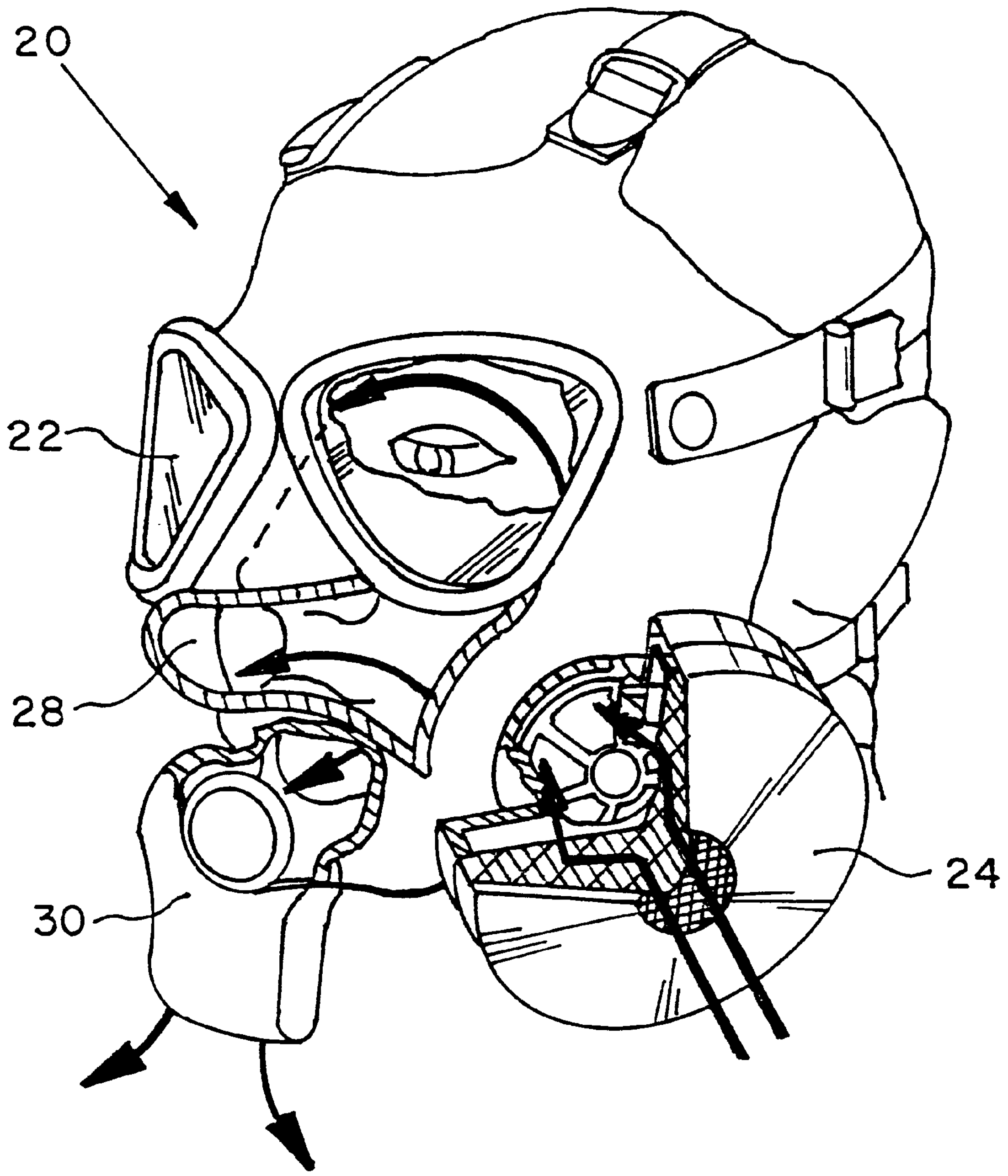
FIG. 4 shows a perspective, partially cut away view of a gas mask, comprising the device from FIG. 1.

A gas mask 20 (FIG. 4) according to the present invention, comprises eye glasses 22, a replaceable filter 24, a nose cap 28, and an air outlet 30. A device according to the present invention as shown in FIG. 1 is arranged in the filter 24.

Computer Model Calculations with Respect to the Choice of Odourants

A computer model was developed by the inventors, in order to investigate the displaceability of different odourants from activated carbon by means of different adsorbates.

The computer model calculates the loading of odourant on the activated carbon before exposure to the adsorbate (begin situation) and also calculates the loading of the odourant on the activated carbon when this is in equilibrium with a known concentration of adsorbate (end situation).

The level of loading in both situations, (begin, end) was calculated with the aid of a model in the form of a Pascal program. With this model it was determined whether the amount of odourant per gram activated carbon by “certain smelling” was lower than the amount of odourant per gram activated carbon by the not smelling situation. This was determined to be a necessary provision for the release of the odourant at the moment that the carbon loaded with the odourant comes into contact with the adsorbate. The calculations for not smelling (start situation) were made with the aid of the Dubinin adsorption isotherm comparison, and that for the certain smelling (end situation) was made with the aid of the IAS toth comparison.

At the start situation the odourant substrate loading was calculated when the concentration of contamination in the air was zero and wherein the concentration of the odourant was under the odour barrier.

At the end situation, the calculation was carried out when the concentration of contaminant in the atmosphere reached the MAC level and wherein the concentration of odourant in the atmosphere was above the odour barrier.

By MAC value it is meant the maximum acceptable concentration of a gas, vapour, fuse of a substance in the air at a work place during an 8 hour working day.

The loading of varying odourants on activated Saratoga carbon from the Blucher company, when these were exposed to differing concentrations of benzene are shown below in table 1.

TABLE 1

Loading of odourant on active carbon under varying conditions

| odourant | loading of the odourant under varying conditions (g/g carbon) $n_1$[1] | $n_2$[2] | $n_3$[3] | $n_4$[4] | $n_5$[5] |
|---|---|---|---|---|---|
| crotonaldehyde | 0,15 | 0,3530 | 0,2309 | 0,1515 | 0,2493 |
| cyclohexane | 0,14 | 0,2832 | 0,2020 | 0,1291 | 0,1977 |
| butylamine | 0,14 | 0,2937 | 0,2135 | 0,1559 | 0,2231 |
| diisopropylamine | 0,20 | 0,3045 | 0,2538 | 0,2770 | 0,2645 |
| ethyldienenorborene | 0,275 | 0,3964 | 0,3403 | 0,3252 | 0,3939 |
| triethylamine | 0,185 | 0,2948 | 0,2419 | 0,2084 | 0,2495 |
| isoamylacetate | 0,1915 | 0,3131 | 0,1955 | 0,1834 | 0,2406 |
| diisobutylketone | 0,33 | 0,3964 | 0,3666 | 0,3639 | 0,3799 |
| butylcellosolveacetate | 0,44 | 0,4918 | 0,4635 | 0,4626 | 0,4773 |
| ethylmercaptan | 0,0035 | 0,0011 | 0,0001 | 0,0000 | 0,0001 |
| butylmercaptan | 0,037 | 0,016 | 0,002 | 0,0002 | 0,0005 |
| methylcyclohexane | 0,38 | 0,4362 | 0,4086 | 0,4083 | 0,4226 |

[1]$n_1$, 0,1* odour barrier of the odourant, no benzene
[2]$n_2$, 10* odour barrier of the odourant, 1 * MAC value benzene
[3]$n_3$, 1* odour barrier of the odourant, 1 * MAC value benzene
[4]$n_4$, 1* odour barrier of the odourant, 10 * MAC value benzene
[5]$n_5$, 3* odour barrier of the odourant, 10 * MAC value benzene The MAC value of benzene is 30 $mg/m^3$.

A positive difference between the begin situation and the end situation shows that the odourant was displaced by benzene.

Computer Model Research into Varying Activated Carbons

The computer model was also used in order to investigate varying activated carbons loaded with isoamylacetate (IAA) with respect to the displacement thereof by benzene under differing circumstances. The activated carbons used were Saratoga carbon from the Blucher company, ELC carbon from the Norit company, R1-carbon from the Norit company. The results are shown in table 2.

TABLE 2

Loading of isoamylacetate on the differing substrates under varying conditions at 25° C.

| substrate | loading of isoamylacetate under varying conditions (g/g) n1[1] | n2[2] | n3[3] | n4[4] | n5[5] |
|---|---|---|---|---|---|
| SARATOGA | 0,1794 | 0,2861 | 0,1826 | 0,0289 | 0,1494 |
| ELC | 0,1815 | 0,3347 | 0,2038 | 0,0351 | 0,1810 |

TABLE 2-continued

Loading of isoamylacetate on the differing substrates under varying conditions at 25° C.

| | loading of isoamylacetate under varying conditions (g/g) | | | | |
|---|---|---|---|---|---|
| substrate | n1[1] | n2[2] | n3[3] | n4[4] | n5[5] |
| R1 | 0,1236 | 0,2671 | 0,1543 | 0,0288 | 0,1493 |

[1]0.1 times the odour barrier of isoamylacetate, no benzene
[2]10 times the odour barrier of isoamylacetate, 1*MAC value of benzene
[3]1 times the odour barrier of isoamylacetate, 1*MAC value of benzene
[4]1 times the odour barrier of isoamylacetate, 10*MAC value of benzene
[5]10 times the odour barrier of isoamylacetate, 10* MAC value of benzene Experimental:

Research into the displacement of an odourant from a layer of activated carbon.

Figure 27:
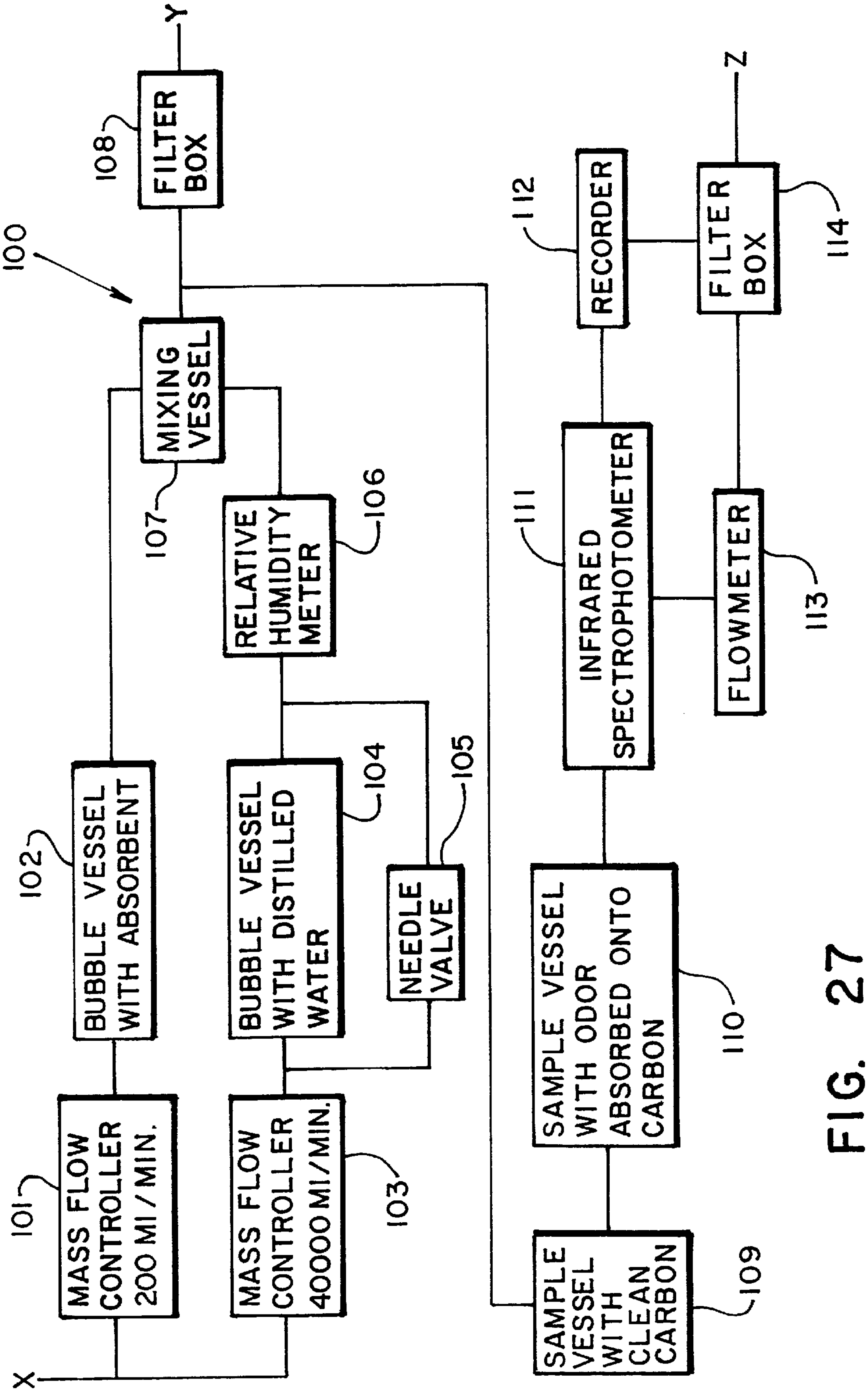
FIG. 27 schematically shows a first system used by the inventors in order to research the displaceability of odourants.

The displacement experiments were carried out in the system 100 (FIG. 27) wherein the reference numerals refer to the following elements:

101=mass flow controller 200 ml/min (HI-TEC)
102=bubble vessel with adsorbent
103=mass flow controller 40000 ml/min (HI-TEC)
104=bubble vessel with distilled water
105=needle valve
106=relative humidity meter (VAISALA)
107=mixing vessel
108=filter box
109=sample vessel with clean carbon
110=sample vessel with odour adsorbed onto the carbon
111=infrared spectrophotometer MIRAN 80 (WILKS)
112=recorder (Kipp & Zonen)
113=flow meter (ROTA)
114=filter box By arranging the optimum wave lengths of the substances to be adsorbed and the odourant in the infrared spectrophotometer, it was possible to simultaneously determine the concentration of odourant and adsorbent in the effluent. For experiments wherein under dry conditions the displacement of the odourant by the adsorbate was measured, the arrangement was adjusted by leaving out components 4, 5 and C. The amount of carbon in vessel 10 was roughly 0.25 grams (0.5 cm bed height), in these experiments, the carbon loaded with odourant in vessel 11 was roughly 0.30 grams (0.5 cm bed height). This configuration differs from the system shown in FIG. 5, since the odour alarm is placed behind the adsorption bed. In the system according to FIG. 5, the break through of the adsorbate is determined by the part of the carbon bed arranged parallel to the tube.

Figure 5:
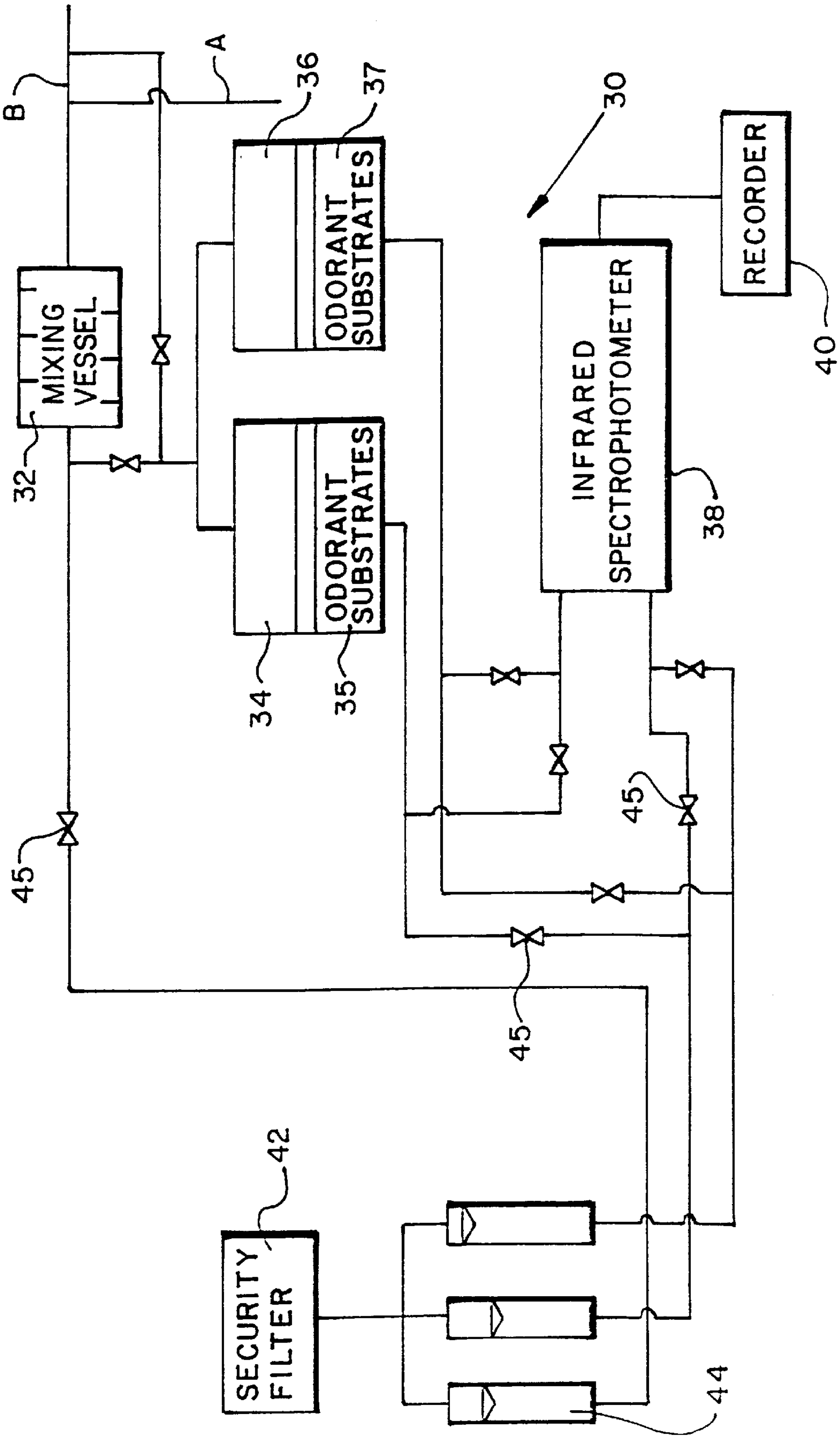
FIG. 5 schematically shows a second system used by the inventors to research the displaceability of odourants from a device as shown in FIG. 1.

For determination of the influence of humid air on the displacement of isoamylacetate by toluene, the arrangement as shown in FIG. 5 was used. The relative humidity by these experiments was equal to 80%. With the aid of the mass flow controller the concentration of toluene was arranged. By arranging the wave lengths of isoamylacetate, toluene and water vapour in the infrared spectrophotometer, it was possible to determine the concentrations of all three substances simultaneously in the effluent.

The conditions of these experiments are shown below in table 3, wherein the results in FIGS. 6 to 20 are shown.

TABLE 3

Overview of the displacement experiments carried out

Figure 6:
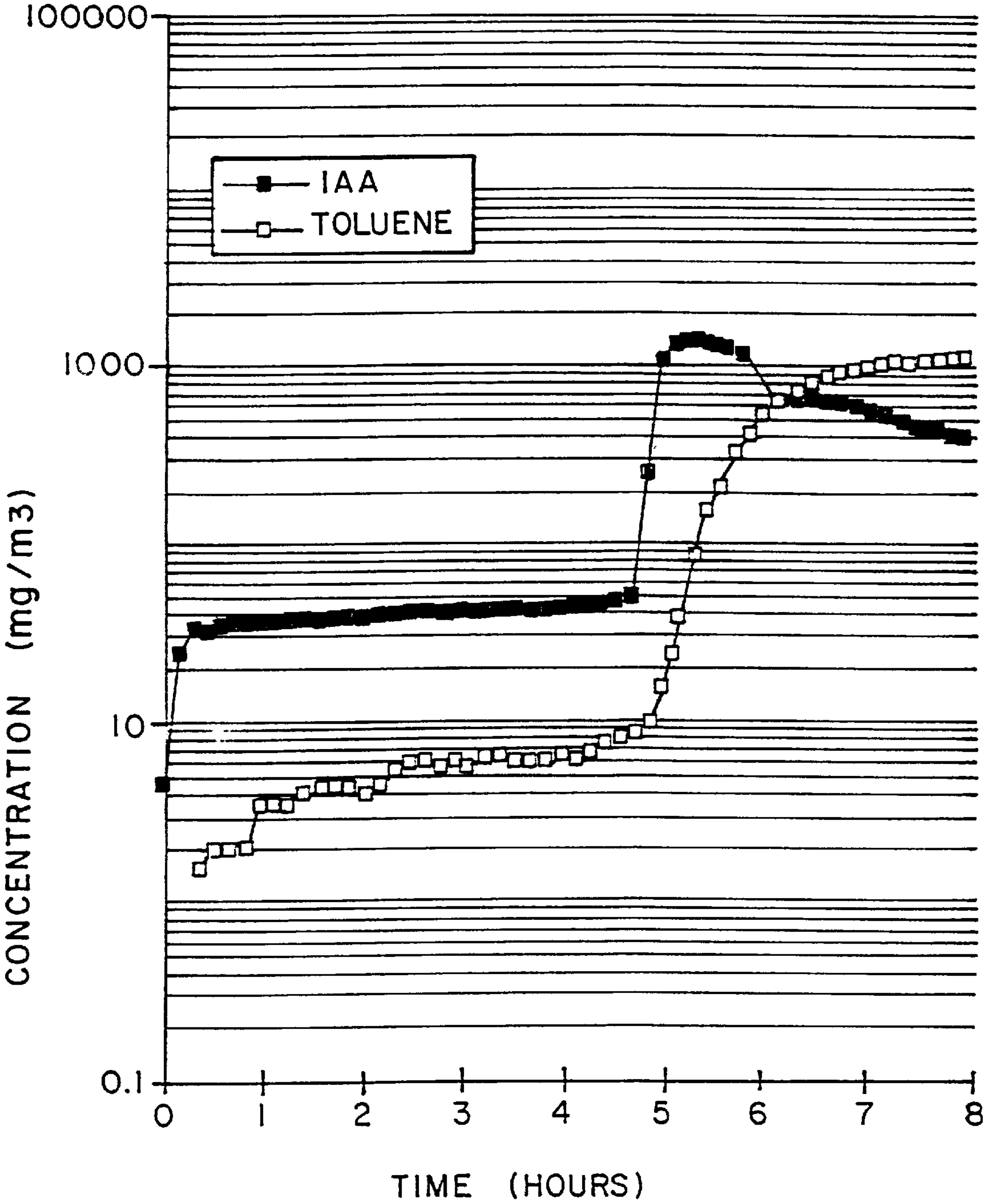
FIGS. 6 to 20 show graphically the manner of displacement of varying odourants by varying adsorbates.
Figure 7:
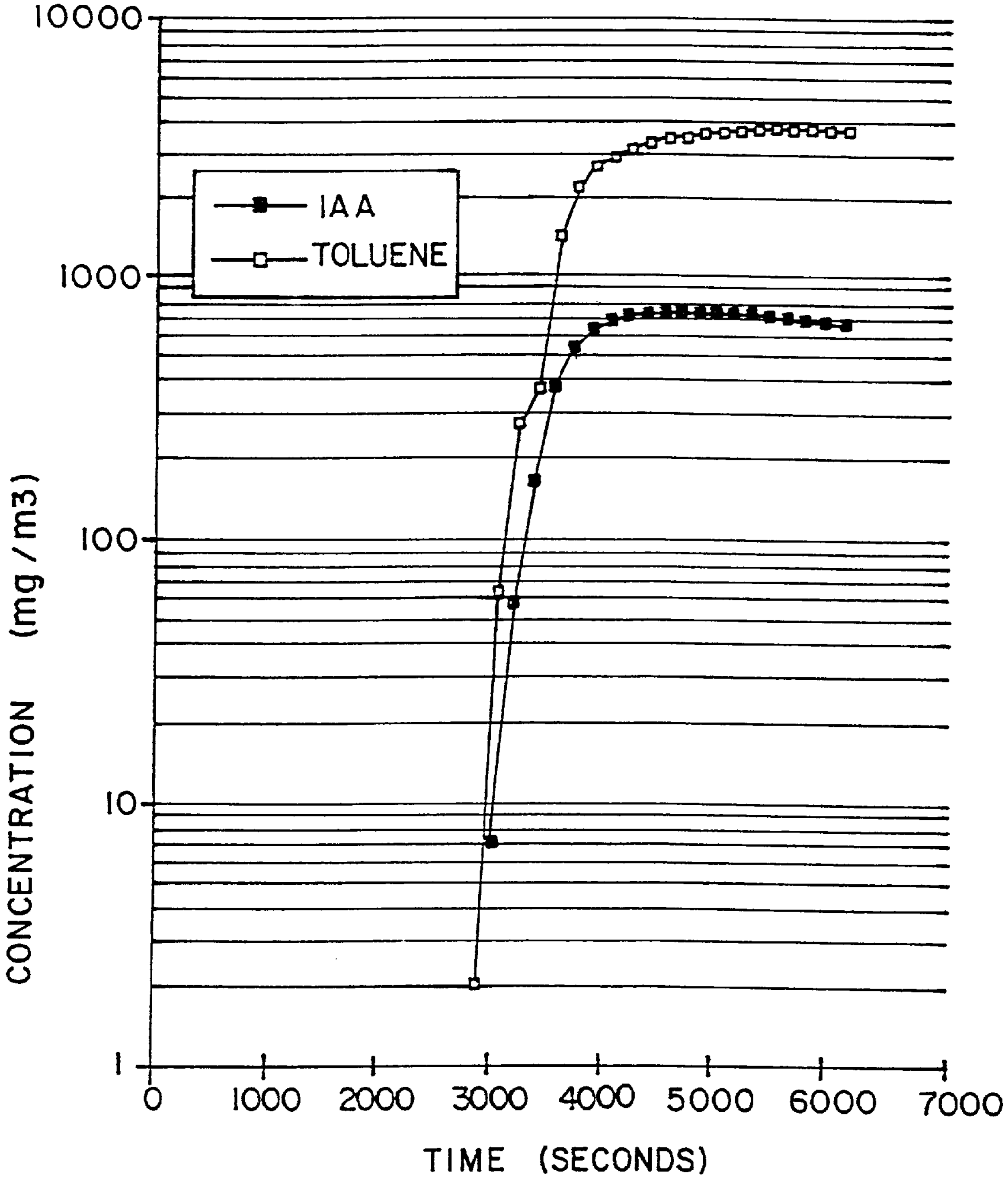
Figure 8:
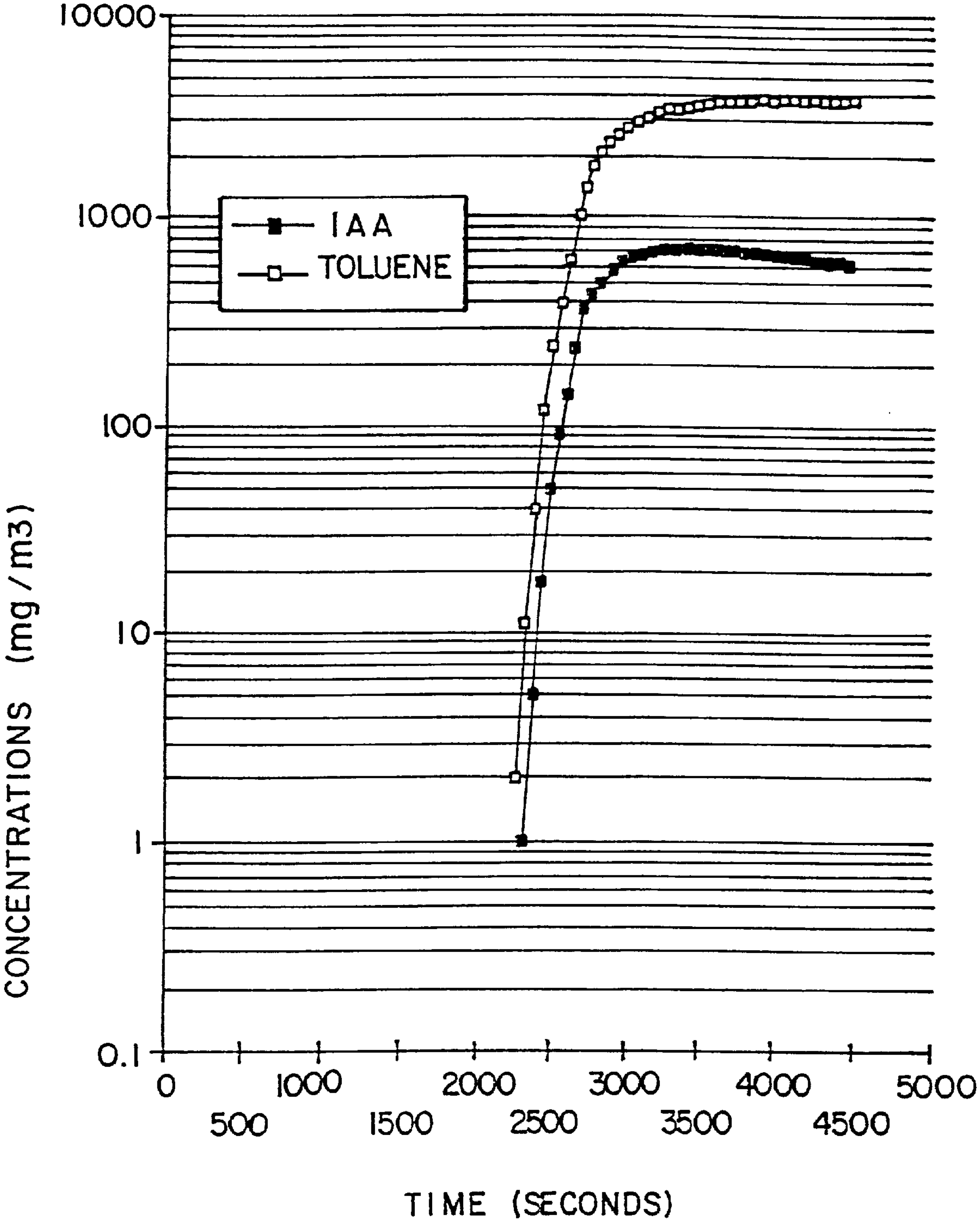
Figure 9:
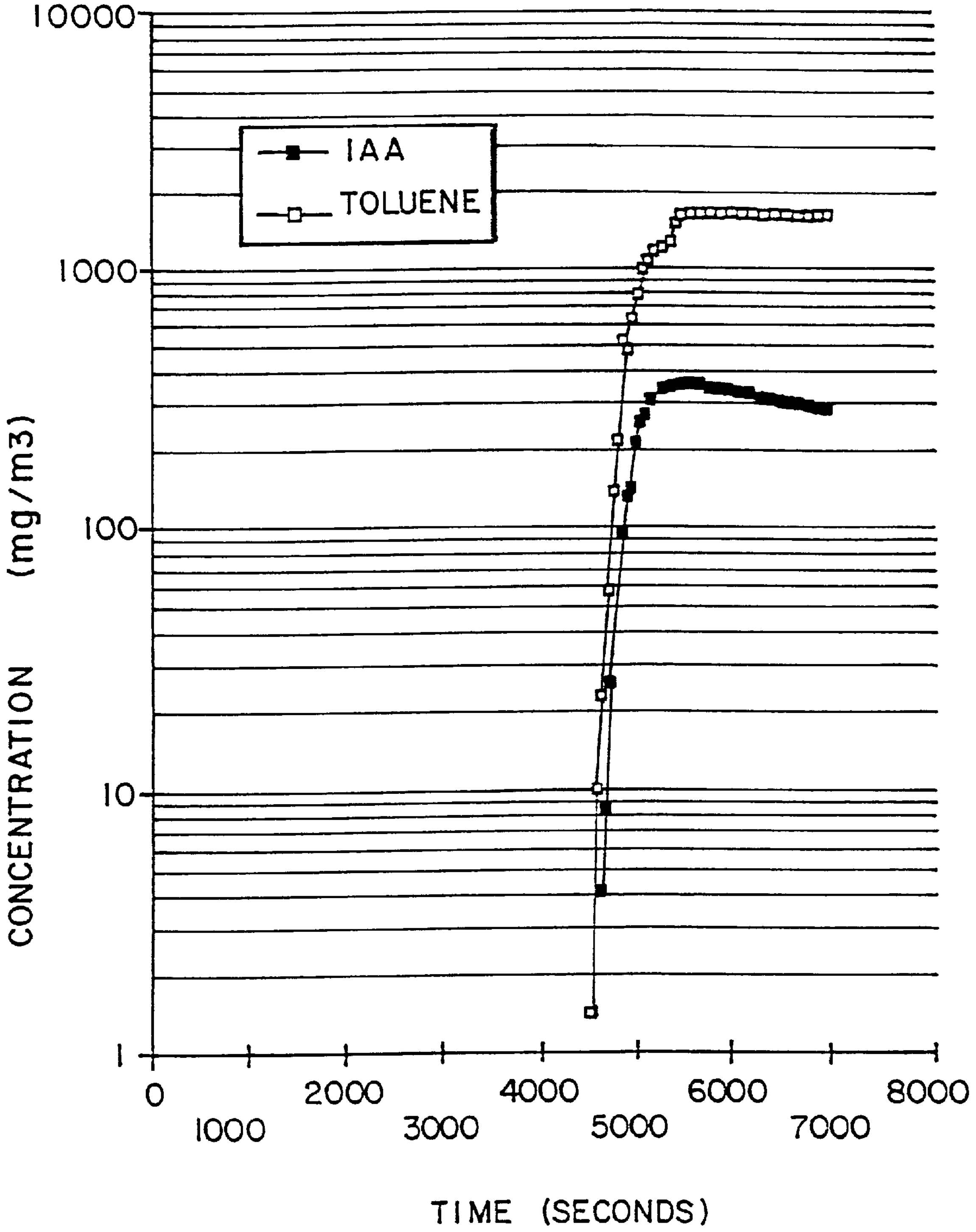
Figure 10:
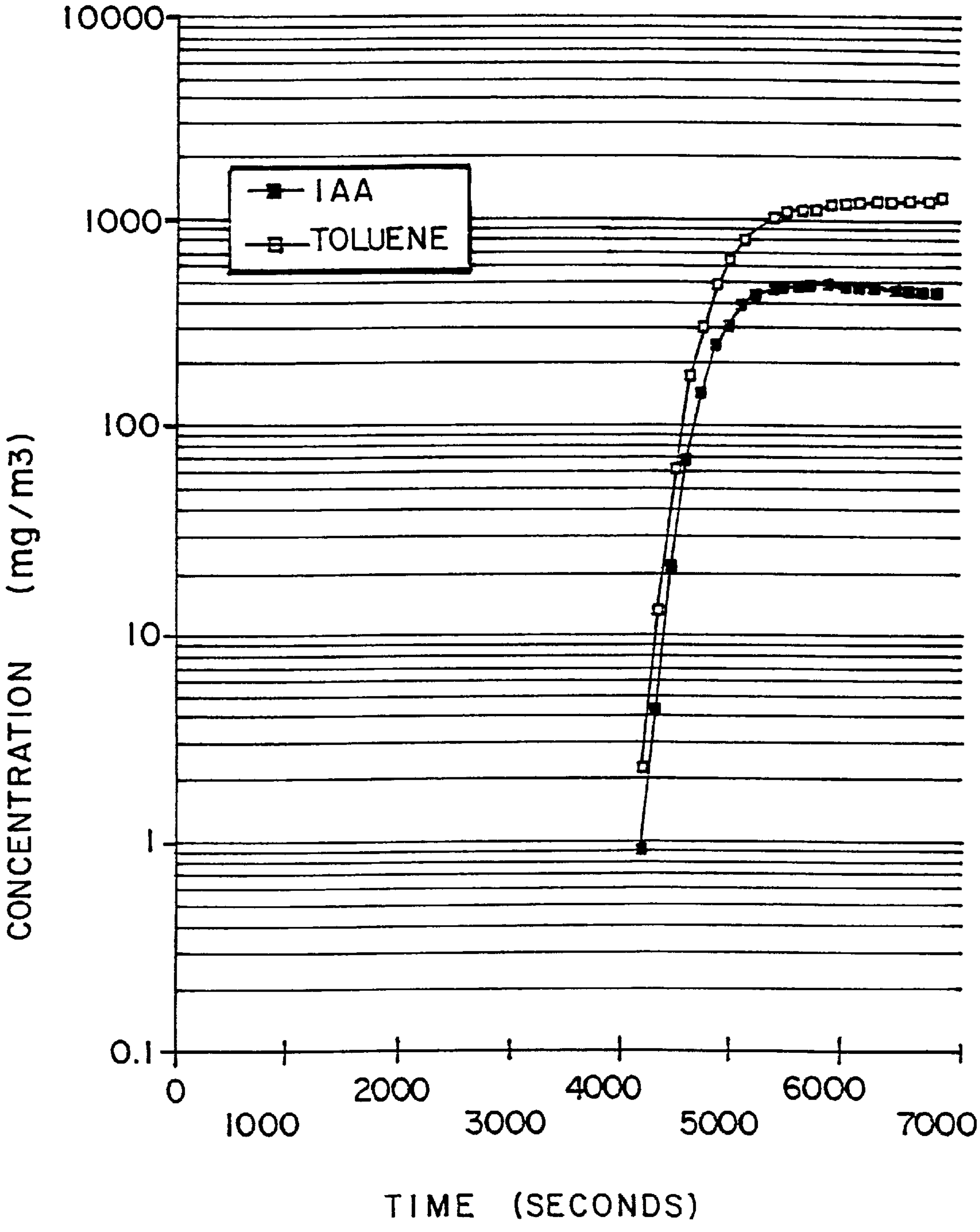
Figure 11:
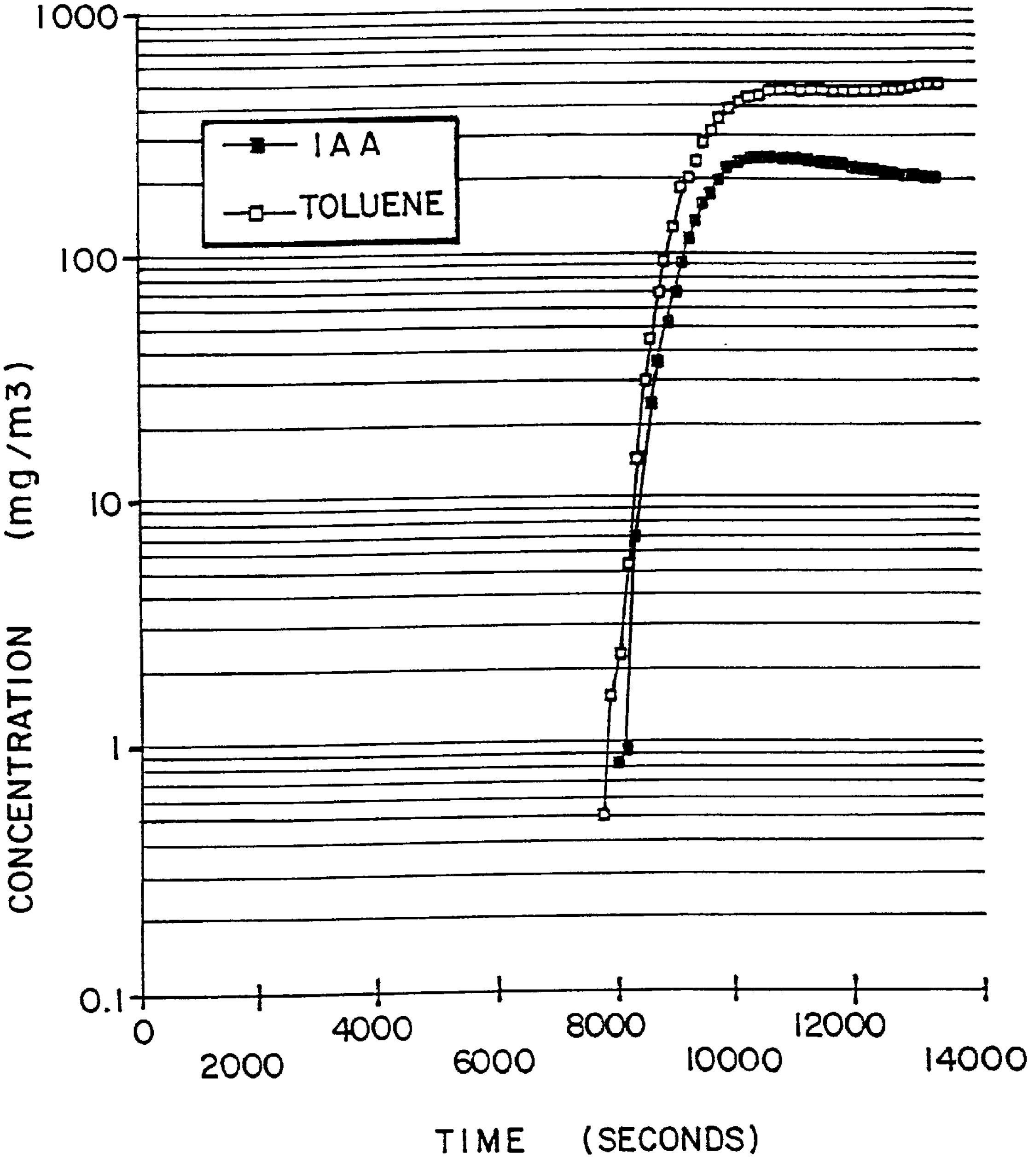
Figure 12:
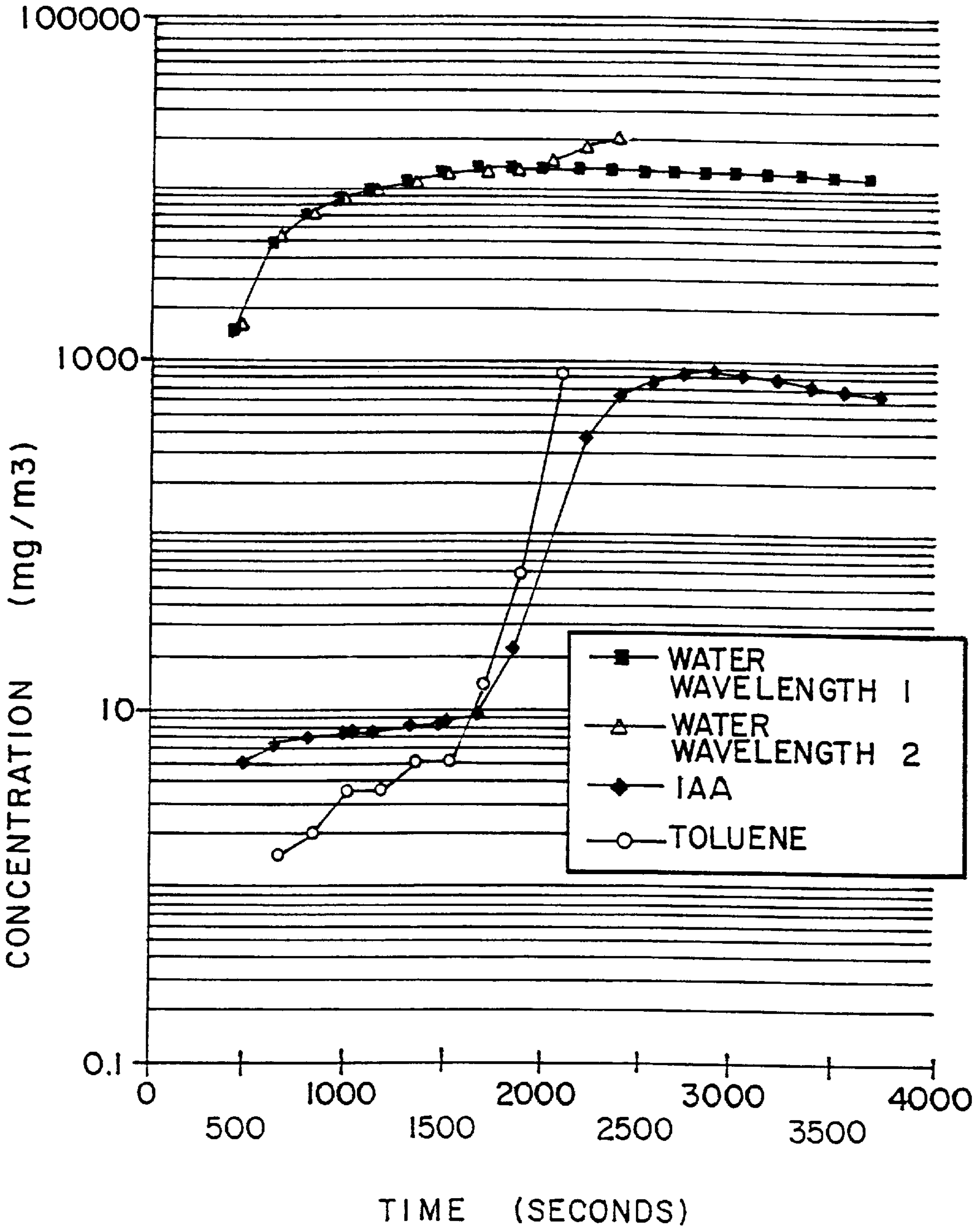
Figure 13:
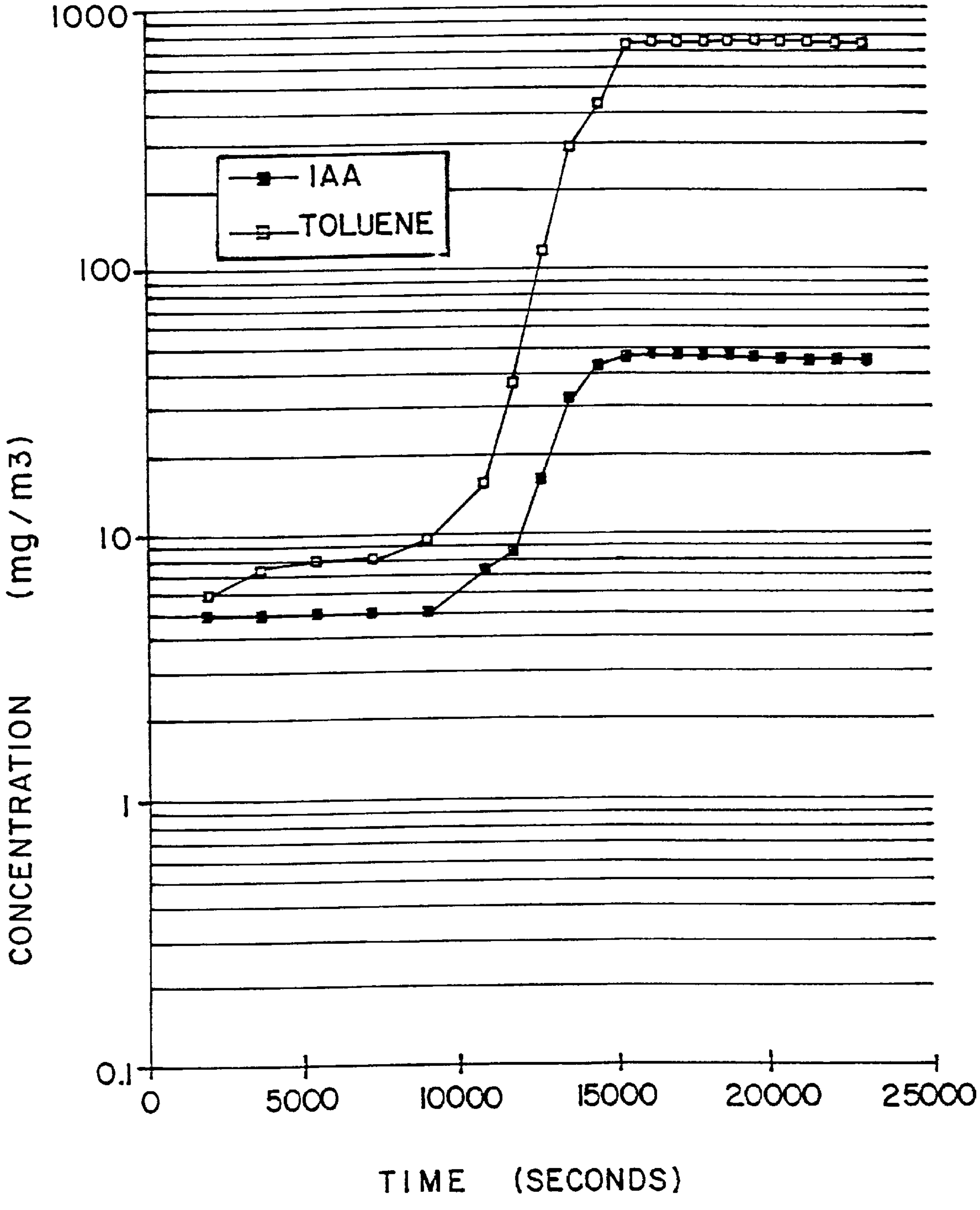
Figure 14:
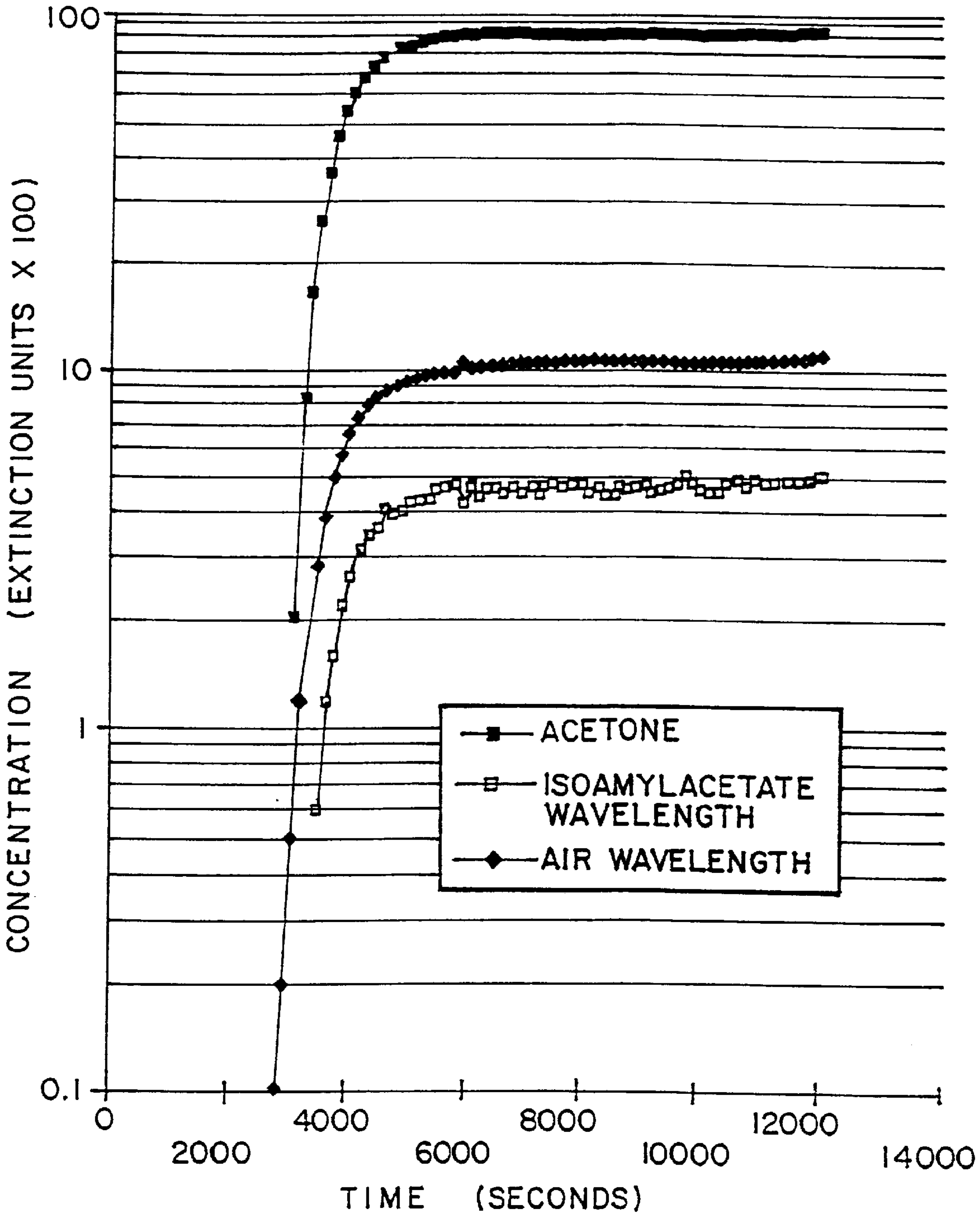
Figure 15:
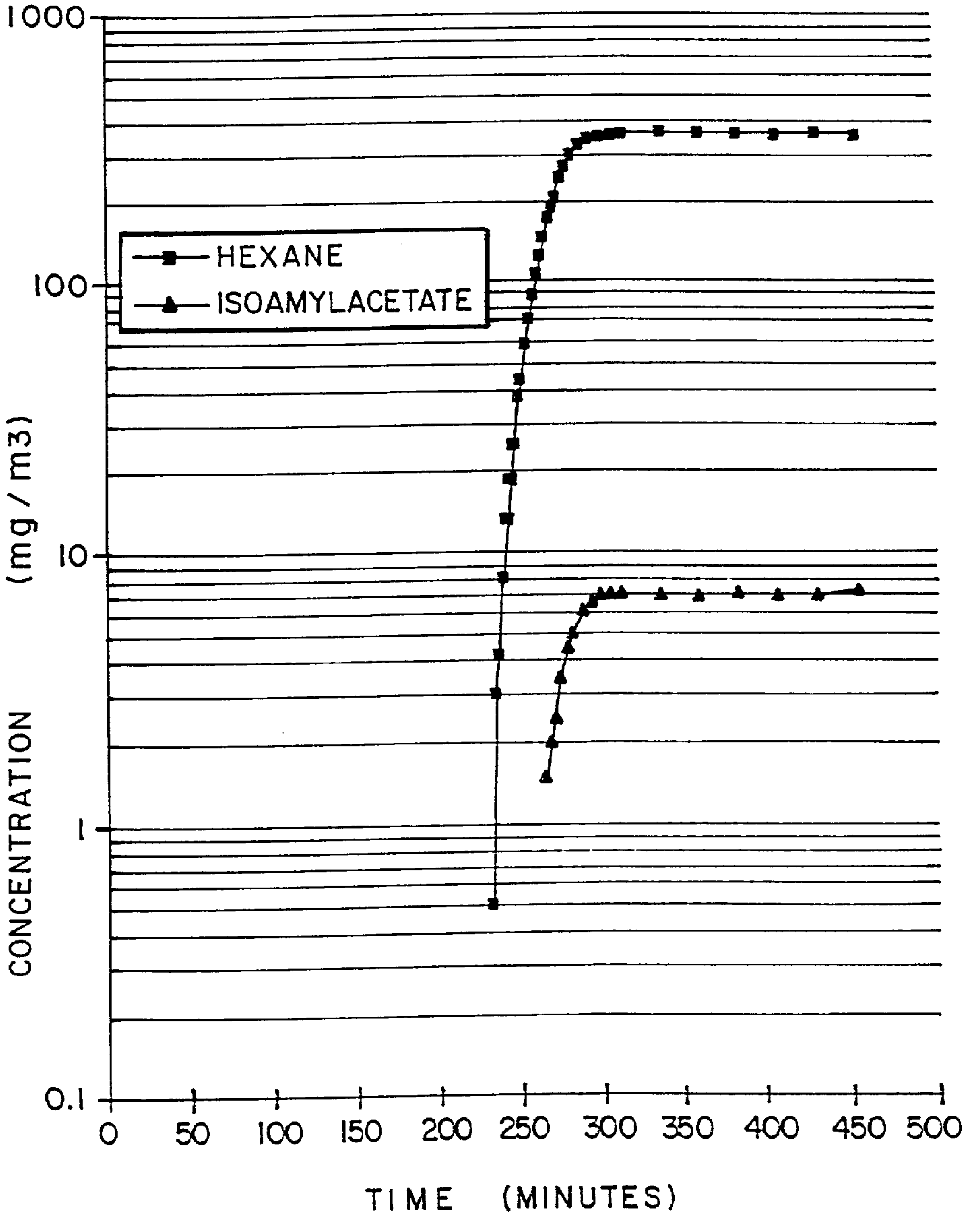
Figure 16:
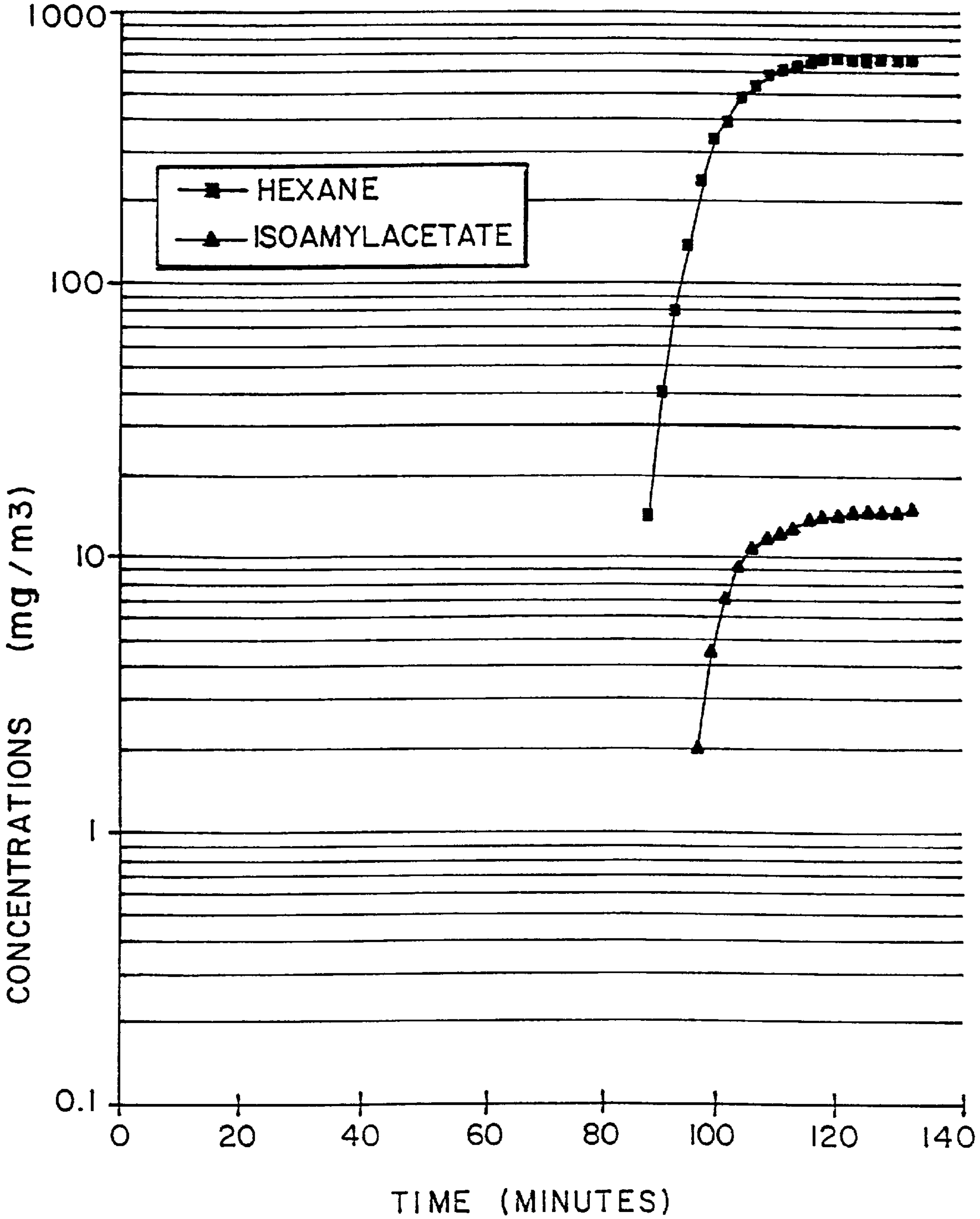
Figure 17:
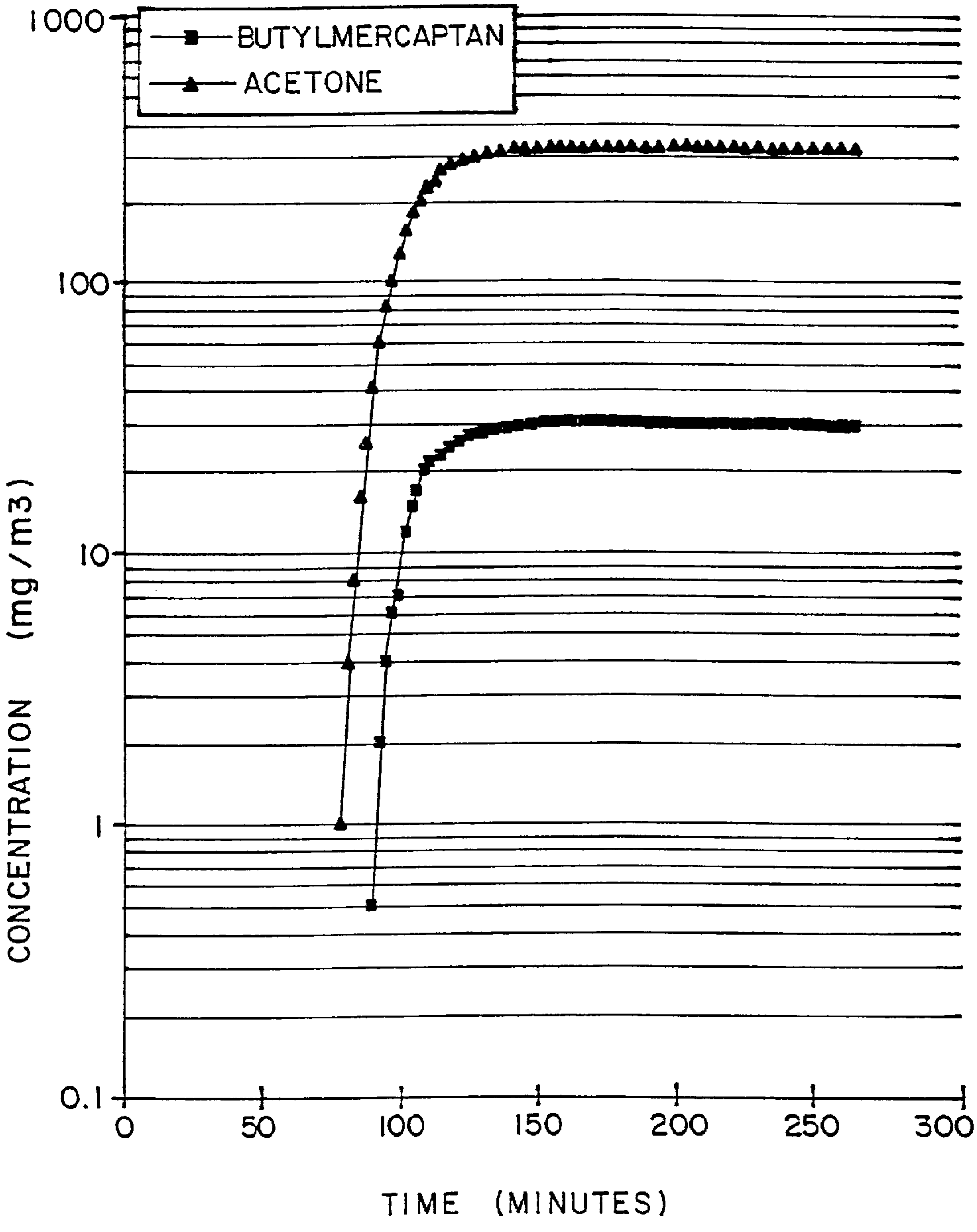
Figure 18:
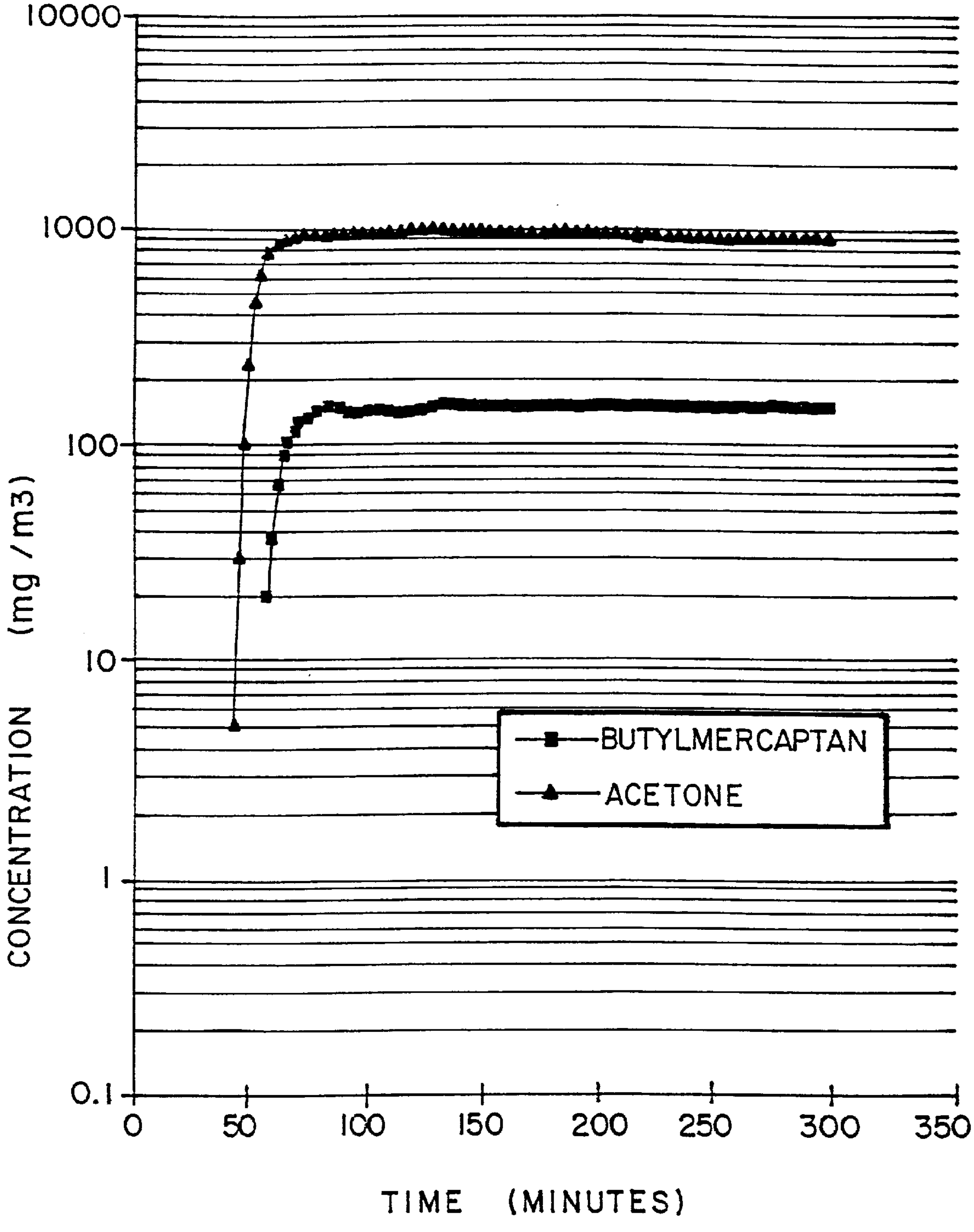
Figure 19:
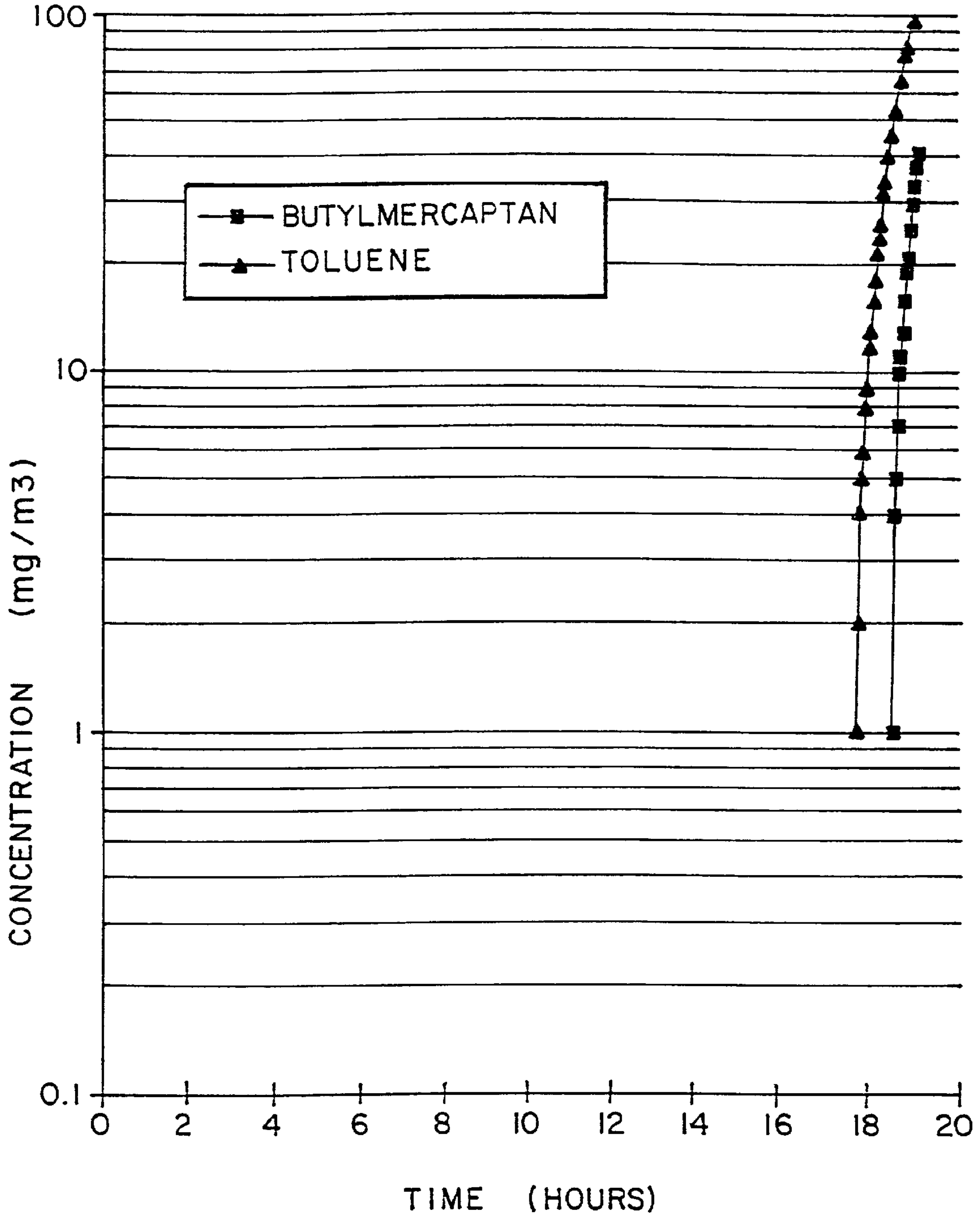
Figure 20:
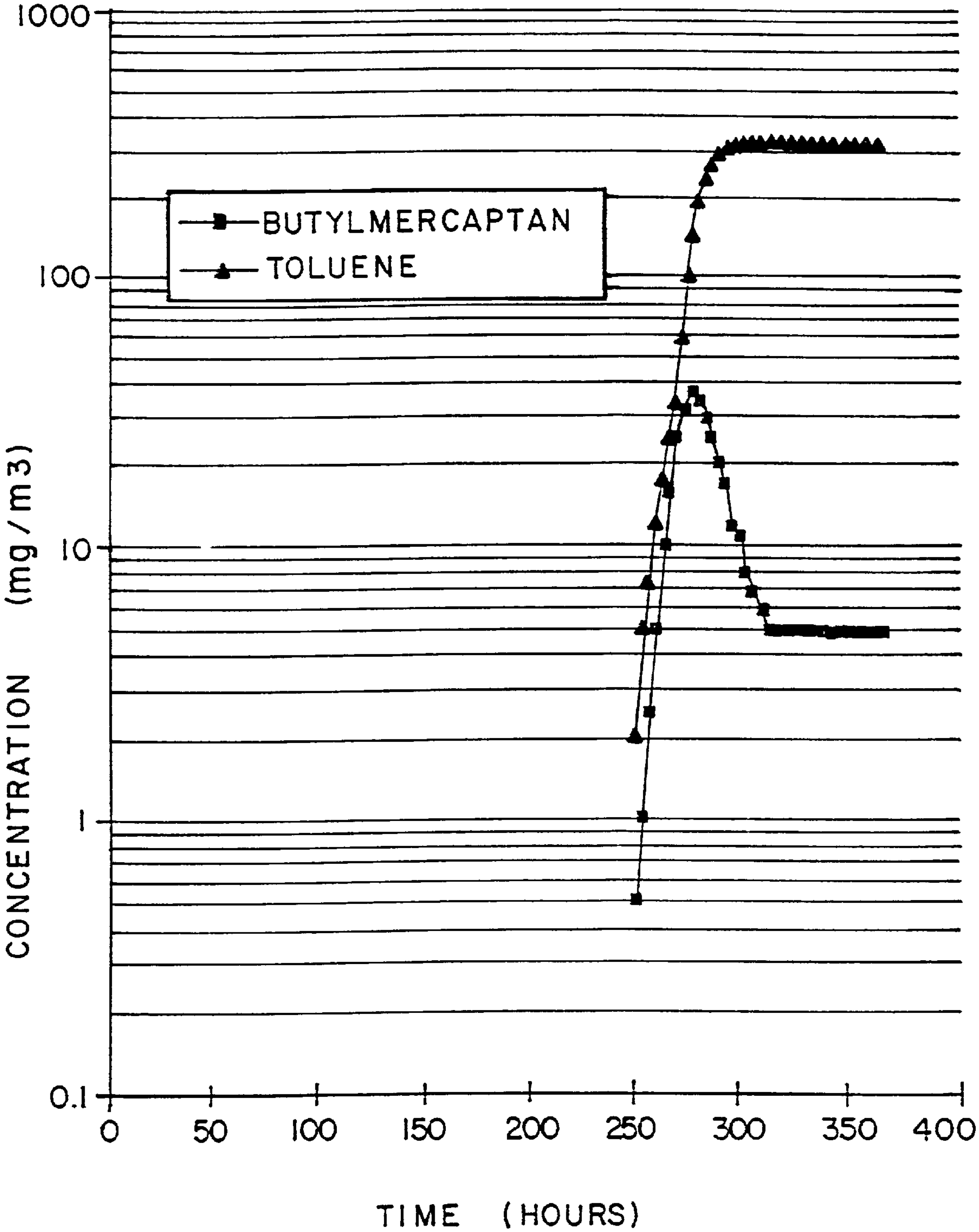

| | Loading of odourant (g/g) | Flow (L/min) | Temp. 23° C. | Concentration of adsorbate ($mg/m^3$) | Relative humidity (%) |
|---|---|---|---|---|---|
| Isoamylacetate Toluene | | | | | |
| FIG. 6 | 0,3737 | 0,7 | | 4000 | 0 |
| FIG. 7 | 0,1890 | 0,7 | | 4000 | 0 |
| FIG. 8 | 0,1890 | 1,0 | | 4000 | 0 |
| FIG. 9 | 0,1890 | 1,0 | | 1500 | 0 |
| FIG. 10 | 0,2400 | 1,0 | | 1500 | 0 |
| FIG. 11 | 0,2400 | 1,0 | | 540 | 0 |
| FIG. 12 | 0,2400 | 1,0 | | 4000 | 80 |
| FIG. 13 | 0,1588 | 1,0 | | 540 | 80 |
| Acetone | | | | | |
| FIG. 14 | 0,1749 | 1,0 | | 290 | 0 |
| Hexane | 0,1724 | 1,0 | | 280 | 0 |
| FIG. 15 | 0,1724 | 1,0 | | 700 | 0 |
| Butylmercaptan Acetone | | | | | |
| FIG. 17 | 0,1180 | 1,0 | | 290 | 0 |
| FIG. 18 | 0,1180 | 1,0 | | 2000 | 0 |
| Toluene | | | | | |
| FIG. 19 | 0,1180 | 1,0 | | 54 en 271 | 0 |
| FIG. 20 | 0,1180 | 1,0 | | 540 | 0 |

Table 4 provides a summary of eight of the values measured during these experiments:

TABLE 4

The loading of isoamylacetate and the effluent concentration of isoamylacetate at the moment in time when the concentration absorbate was 1 or 100 $mg/m^3$, the warning time* and the concentration of isoamylacetate at the end of the experiment

| Experiment | $W_0$ (g/g) | $C_0$ | $t_{1\ mg}$ (s) | $C_1$ | $W_1$ (g/g) | $t_{100}$ (s) | $C_{100}$ | $W_{100}$ (g/g) | Warning time (s) | $C_{end}$ |
|---|---|---|---|---|---|---|---|---|---|---|
| Toluene | | | | | | | | | | |
| FIG. 8 | 0.1890 | 4000 | 2270 | <det lim | 0.1890 | 2425 | 17 | 0.1889 | 360 | 700 |
| FIG. 9 | 0.1890 | 1500 | 4510 | <det lim | 0.1890 | 4750 | 50 | 0.1884 | 360 | 340 |
| FIG. 10 | 0.2400 | 1500 | 4200 | 0.9 | 0.2395 | 4550 | 50 | 0.2370 | 840 | 490 |
| FIG. 11 | 0.2400 | 540 | 8100 | 0.8 | 0.2399 | 9254 | 136 | 0.2349 | 1140 | 240 |
| FIG. 12 | 0.2400 | 4000 | 660 | 6.5 | 0.2397 | 1900 | 45 | 0.2380 | 1080 | 800 |

TABLE 4-continued

The loading of isoamylacetate and the effluent concentration of isoamylacetate at the moment in time when the concentration absorbate was 1 or 100 mg/m$^3$, the warning time* and the concentration of isoamylacetate at the end of the experiment

| Experiment | $W_0$ (g/g) | $C_0$ | $t_{1\ mg}$ (s) | $C_1$ | $W_1$ (g/g) | $t_{100}$ (s) | $C_{100}$ | $W_{100}$ (g/g) | Warning time (s) | $C_{end}$ |
|---|---|---|---|---|---|---|---|---|---|---|
| FIG. 13 Hexane | 0.1588 | 540 | 1800 | 5 | — | 13000 | 20 | — | 11000 | 45 |
| FIG. 15 | 0.1724 | 280 | 14000 | <det lim | 0.1724 | 15580 | 0 | 0.1724 | 1300 | 7 |
| FIG. 17 | 0.1724 | 700 | 5200 | <det lim | 0.1724 | 5600 | 0 | 0.1724 | 1920 | 16 |

*The warning time is defined as the time between reaching the odour barrier of IAA and the MAC value of the adsorbate. The moment when the odour barrier is passed is found by extrapolation of the relation between the logarithm of odourant and the time.
$W_0$ = Loading of isoamylacetate at the start of the experiment (g/g)
$C_0$ = The entry concentration of the adsorbate (mg/m$^3$)
$t_{1\ mg}$ = Time at which the concentration adsorbate is equal to 1 mg/m$^3$ (s)
$C_1$ = Concentration of IAA at the time when the concentration adsorbate is 1 mg/m$^3$ (mg/m$^3$)
$W_1$ = Odourant loading at the moment when the concentration of adsorbate is 1 mg/m$^3$ (g/g)
$t_{100}$ = (s) = Time when the concentration of adsorbate is equal to 100 mg/m$^3$ (s)
$C_{100}$ = The concentration of IAA at the time when the concentration adsorbate is 100 mg/m$^3$ (mg/m$^3$)
$W_{100}$ = The odourant loading at the moment when the concentration adsorbate is 100 mg/m$^3$ (g/g)
$C_{end}$ = Concentration of odourant at the end of the experiment (equilibrium emission) (mg/m$^3$)

Experiments Carried Out in the System 30 (FIG. 5)

Further experiments were carried out in the system 30 (FIG. 5), see below.

A stream of air saturated with toluene (stream A) was guided through a mixing vessel 32 by means of pressure air stream B with the correct relative humidity. The mixing vessel 32 was used in order to obtain a good mixing. Subsequently, the air containing the toluene was guided, not simultaneously, through two devices 34, 36, equipped with two odourant substrates 35, 37 respectively, whereafter the effluent was analyzed in a Miran 80 infrared spectrometer 38 and the results were recorded in recorder 40.

The system 30 further consisted of a security filter 42, rotameters 44 and valves 45 in order to guide the stream in the correct direction.

The devices 34 and 36 were firstly conditioned for 20 minutes. A clean air stream was guided through the devices. During this conditioning, the gas stream behind the devices was measured to detect for the presence of any odourant. If the odourant was detected, there was a question of desorption and the experiment was stopped. Following conditioning, a gas stream with dangerous substances was guided through the devices, in order to carry out the following experiments:

Influence of the Air Resistance on the Displacement of Isoamylacetate from Saratoga Carbon Devices 34 and 36 were arranged as follows:

Odourant substrate device 34:

0.07 g Saratoga carbon with a diameter of 6 mm, a height of 5 mm and loaded with 0.1724 gram IAA per gram Saratoga carbon.

Odourant substrate device 36:

0.040 g Saratoga carbon loaded with 0.1724 g/g IAA with a diameter of 6 mm, a height of 5 mm in 45 PPI reticulated foam.

Adsorbent in devices 34 and 36

Norit R1 carbon having a diameter of 50 mm and a height of 10 mm

Experimental conditions:

Temperature=25° C.

Relative humidity=0%

Air with toluene stream per minute=7.5 L/min

Concentration toluene in the system (stream A+B)=2800 mg/m$^3$

Unless otherwise reported, the odourant substrate was arranged on the underside of the layer of adsorbent.

Figure 21:
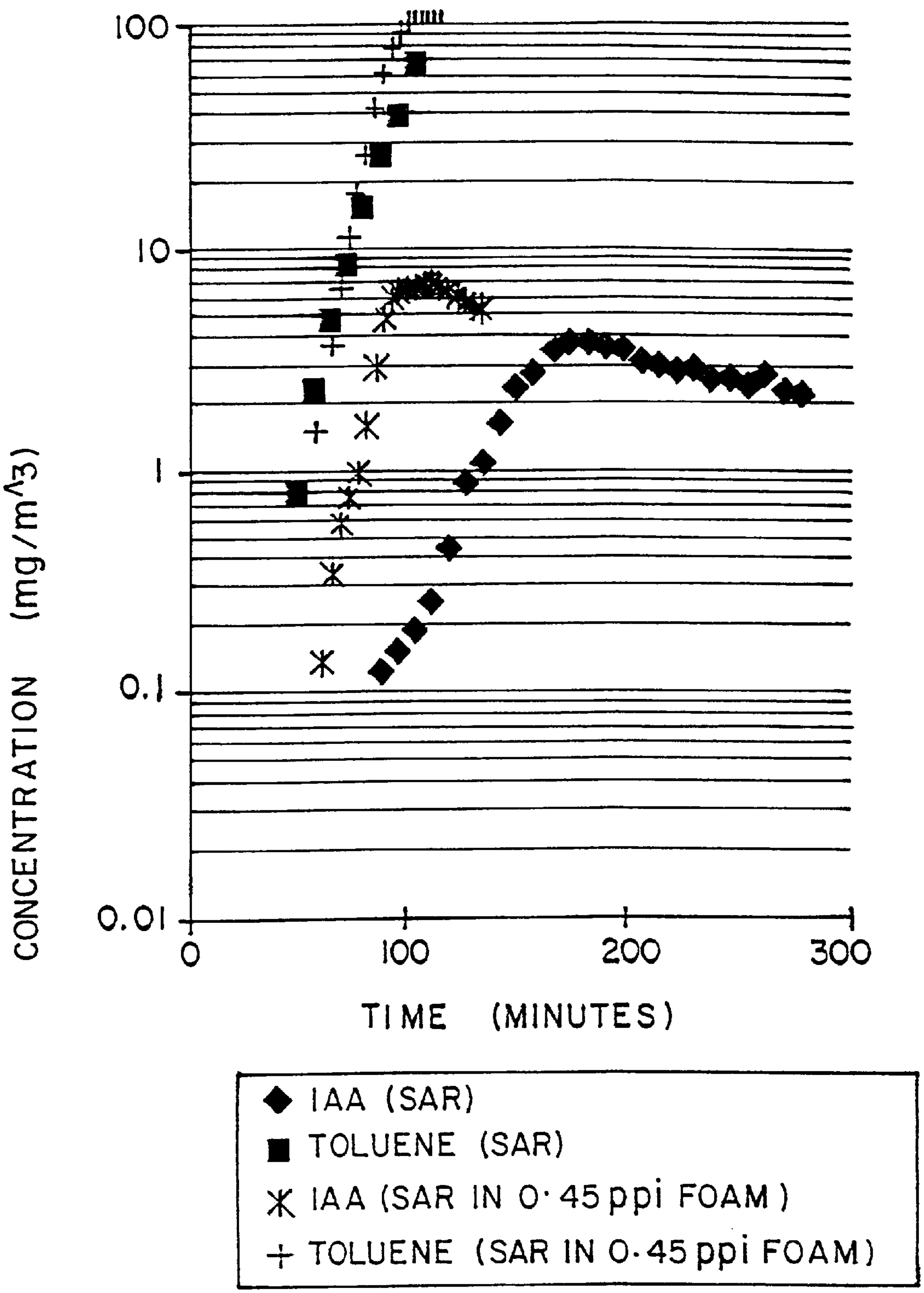
FIG. 21 shows the influence of the air resistance on the displacement of isoamylacetate from Saratoga carbon.

The results are shown in FIG. 21.

Influence of the Position of the Odourant Substrate in the Device

The influence of the depth of the odourant substrate in the device on the displacement of isoamylacetate and the breakthrough of toluene was measured. The experiment was carried out in a system as shown in FIG. 5. The depth of the odourant substrate S in the device, is the distance from the surface of the adsorbent to the surface of the odourant substrate (see FIG. 1).

The device was arranged as follows:

| | |
|---|---|
| Odourant substate: | Norit ELC carbon, 6 mm diameter, 5 mm height, IAA loading, 0.2376 (g/g) |
| Adsorbing: material: | Norit R1 carbon, 50 mm diameter, 10 mm height |
| Conditions: | Temperature = 25° C. Relative humidity = 0%, toluene stream per minute = 7.5 L/min, Concentration toluene in the system = 2800 mg/m$^3$ |

Figure 22:
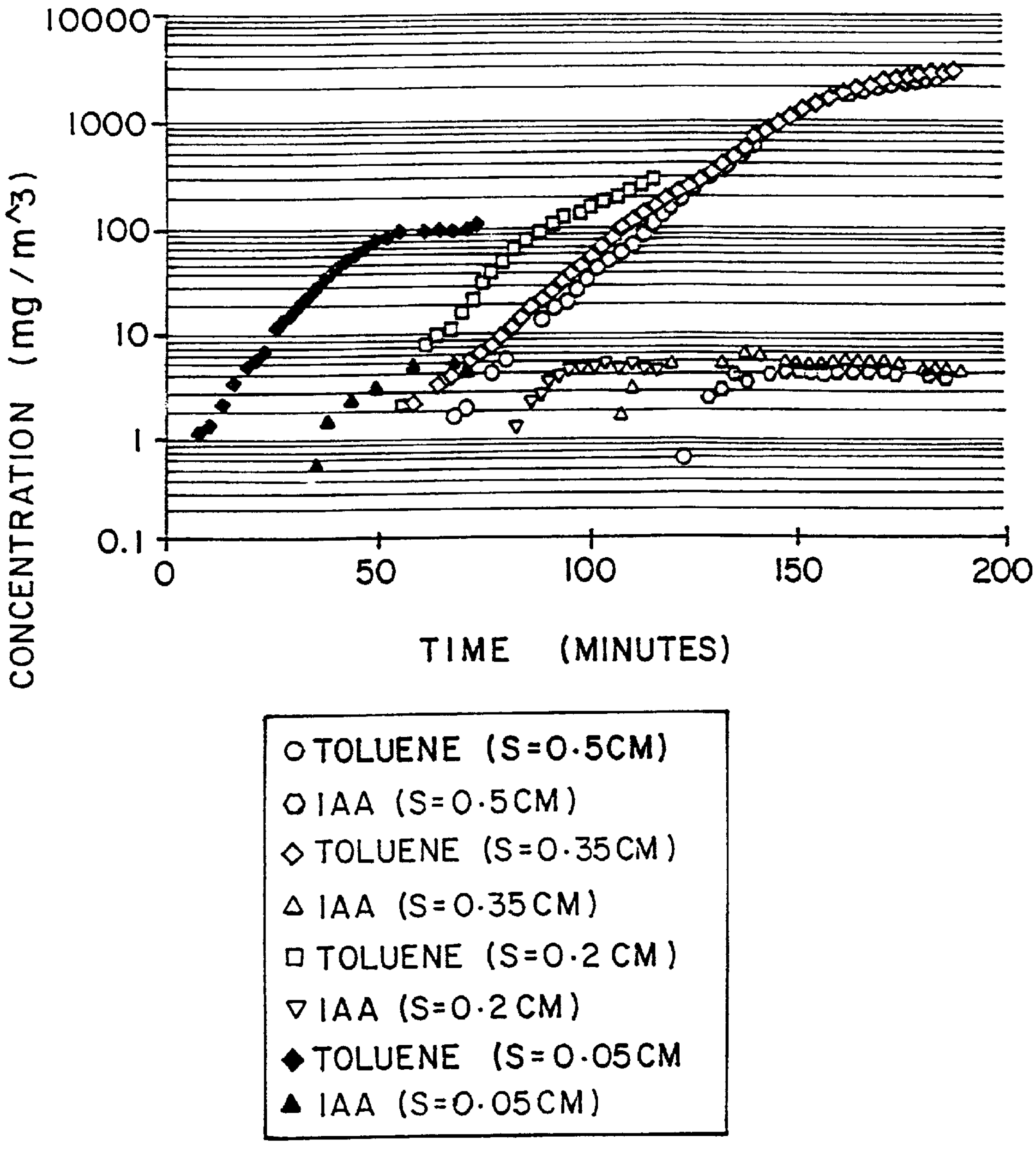
FIG. 22 shows the influence of the positioning of the odourant subtrates in the device.

The results are shown in FIG. 22.

Influence of the Odourant Loading on the Active Carbon

Differing amounts of IAA per unit weight were loaded onto the ELC carbon and displacement was carried out by means of toluene in the system as shown in FIG. 5.

| | |
|---|---|
| Experimental conditions: | Concentration toluene in the air steam Co = 2.8 mg/L<br>Qv = 7.5 L/min<br>T = 25° C.<br>RV < 10% |

Figure 23:
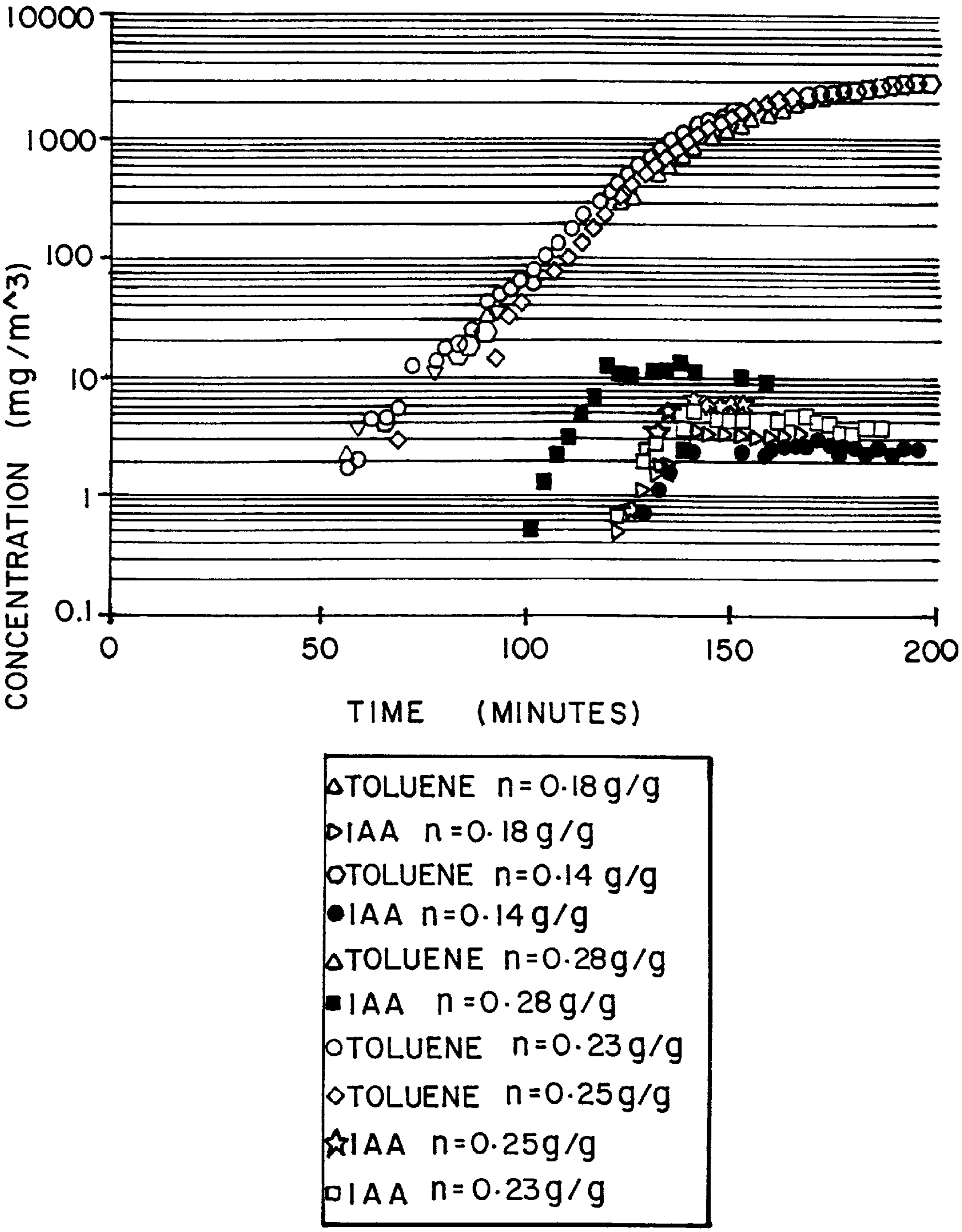
FIG. 23 shows the influence of the odourant loading on the active carbon.

The results of this are shown in FIG. 23.

Influence of the Height of the Device

With this experiment the object was to research whether the height of the device influenced the moment of displacement of the odourant with respect to the adsorbates travelling through the device.

The odourant Substrate with a loading of 0.23 35 g/g IAA was placed at the end of the device and ELC carbon was used as the odourant carrier.

Figure 24:
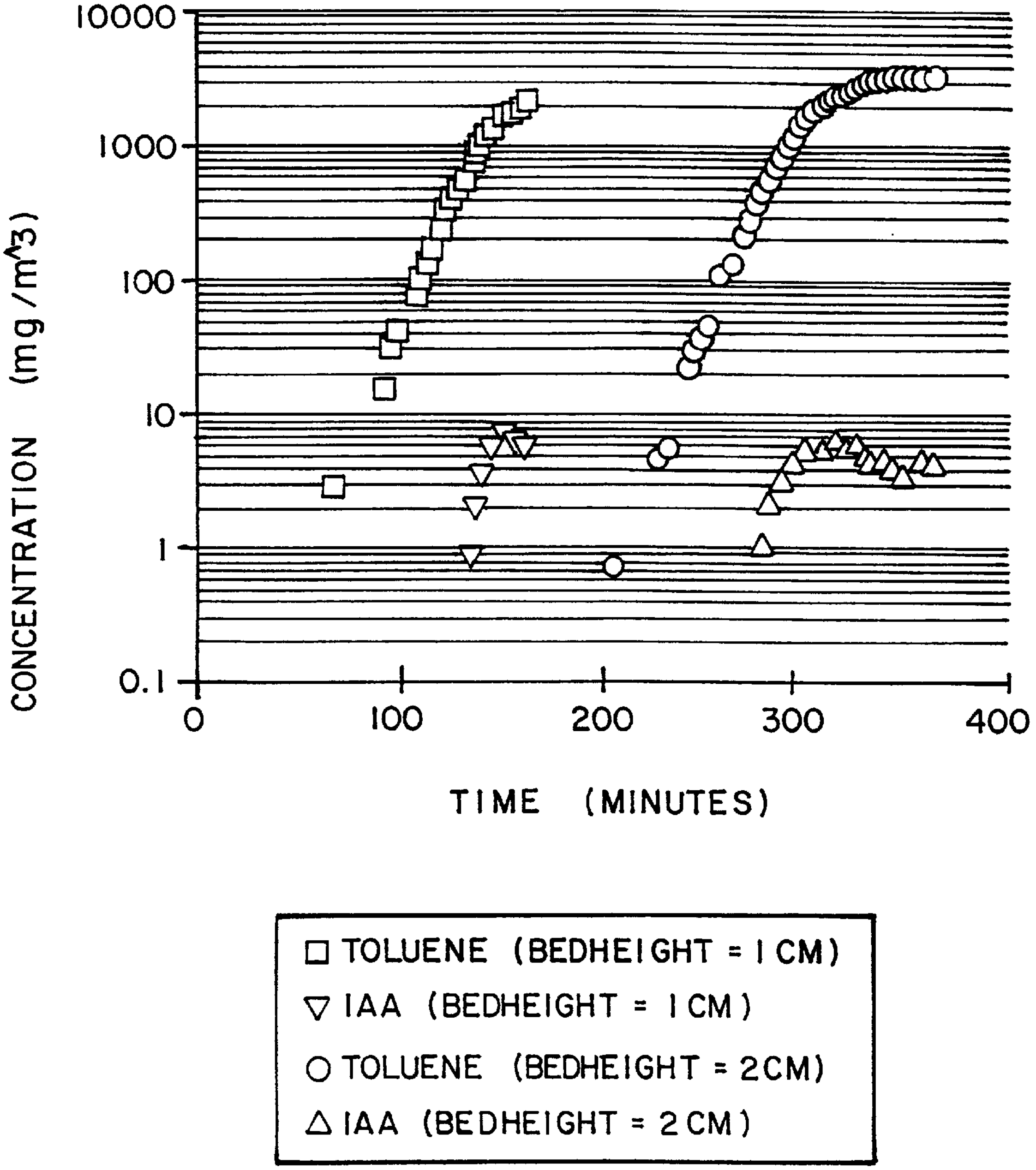
FIG. 24 shows the influence of the height of the odourant substrates in the device.

The experiment was carried out in the system as shown in FIG. 5, wherein two differing bed heights (B) of 1 and 2 cm respectively adsorbent were chosen, as shown in FIG. 1 for the devices 34, 36 respectively. The results of this are shown in FIG. 24.

Influence of the Height of the Odourant Substrate

This experiment was carried out to research whether the height of the odourant substrate influenced the moment in time that the odourant was released and the concentration at which it was released. ELC carbon was used as carrier for the odourant and the odourant substrate was arranged at the bottom of the device. The results of this experiment are shown in FIG. 25.

| | |
|---|---|
| Experimental conditions: | Loading of IAA on ELC carbon 0.2376 g/g<br>Concentration of toluene in the air stream Co = 2.8 mg/L<br>Qv = 7,5 L/min<br>T = 25° V<br>RV < 10%. |

Figure 25:
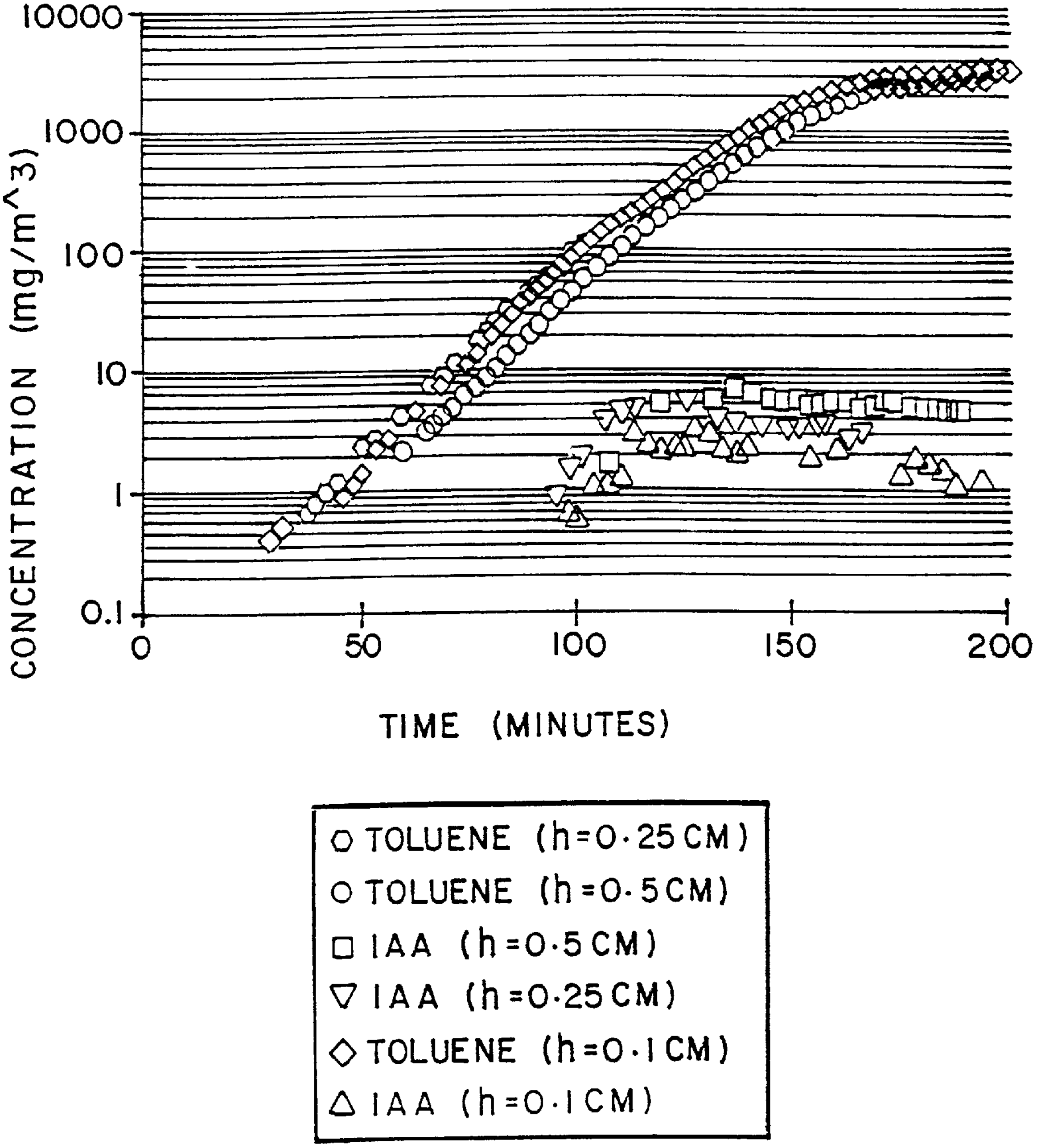
FIG. 25 shows the influence of the height of the odourant substrates on the displacement of isoamylacetate from ELC carbon.

The results of this experiment are shown in FIG. 25.

The requested rights are in no way limited by the above shown and described embodiments of the present invention, rather the requested rights are determined in the first instance by the following claims, the scope of which caters for many possible variations.

We claim:

1. A device for removing one or more substances undesirable or dangerous to humans from a gas or vapour mixture, said device comprising:

a predetermined amount of adsorbent for adsorbing the substances and an odourant for releasing an odour wherein the odourant is arranged in such a manner that said odourant is displaceable by the substances following a predetermined level of saturation of the adsorbent.

2. The device according to claim 1 further comprising an odourant substrate onto which the odourant is loaded.

3. The device according to claim 2, wherein the density of the odourant substrate differs from the density of the adsorbent.

4. The device according to claim 2, wherein the adsorbent or the odourant substrate or both is substantially at least one of micro-porous, macro-porous, and meso-porous in nature.

5. The device according to claim 2, wherein the adsorbent or the odourant substrate or both is substantially hydrophobic.

6. The device according to claim 2, wherein the adsorbent or the odourant substrate or both is substantially homogenous.

7. The device according to claim 2, wherein the adsorbent or the odourant substrate or both comprises activated carbon.

8. The device according to claim 7, wherein the activated carbon is synthetic.

9. The device according to claim 8, wherein the activated carbon is chosen from the group consisting of Norit R1 carbon, Saratoga carbon and ELC carbon.

10. The device according to claim 2, wherein the odourant is loaded onto the odourant substrate in the range of 0.01–0.5 g odourant substrate/g adsorbent.

11. The device according to claim 2, wherein the amount of the odourant loaded on the odourant substrate is greatest in the absence of the adsorbate.

12. The device according to claim 2, wherein the odourant substrate is provided with a means for protecting and screening in order to protect and screen the odourant substrate from the adsorbent.

13. The device according to claim 12, wherein the means for protecting and screening comprises an open ended tube arranged in the adsorbent, wherein the odourant substrate is arranged in said tube.

14. The device according to claim 2, wherein the ratio of the surface area of the odourant substrate to the surface area of the adsorbent is about 1:5000.

15. The device according to claim 14, wherein the odourant substrate is arranged in an open ended tube as a foam like material.

16. The device according to claim 15, wherein the foam-like material is PPI foam.

17. The device according to claim 14, wherein the ratio of the surface area of the odourant substrate to the surface area of the adsorbent is about 1:100.

18. The device according to claim 17, wherein the ratio of the surface area of the odourant substrate to the surface area of the adsorbent is about 1:60.

19. The device according to claim 1, wherein the adsorbent is substantially unloaded.

20. The device according to claim 1, wherein the odourant has a characteristic smell and is substantially harmless.

21. The device according to claim 1, wherein the odourant has a low odour barrier.

22. The device according to claim 1, wherein the odourant is substantially chemically inert.

23. The device according to claim 1, wherein the odourant is an organic compound with a boiling point of about 100° C. or lower.

24. The device according to claim 23, wherein the organic compound is chosen from the group consisting of crotonaldehyde, cyclohexane, butylamine, diisopropylamine, ethylidenenorborene, triethylamine, isoamylacetate, diisobutylketone, butylene, butylene cellosolveacetate, ethyl mercaptan, butyl mercaptan, ethylene mercaptan and methylcyclohexane.

25. The device according to claim 24, wherein the organic compound is chosen from the group consisting of cyclohexane, isoamylacetate, butylene, ethyl mercaptan, butyl mercaptan, ethylene mercaptan and methylcyclohexane.

26. The device according to claim 25, wherein the organic compound is isoamylacetate.

27. A gas mask filter comprising a device according to claim 1.

28. A gas mask comprising a gas mask filter according to claim 27.

29. A detector for demonstrating the presence of substances undesirable or dangerous to humans, comprising a device according to claim 1.

30. A filter comprising a device according to claim 1.

31. A bio-bin comprising a device according to claim 1.

32. An air freshener comprising a device according to claim 1.

33. A method of removing one or more substances undesirable or dangerous to humans from a gas or vapour mixture and providing a warning for a saturation level of an adsorbent comprising the steps of:

(1) providing a device as claimed in claim 1;

(2) exposing the device to a gas or vapour mixture containing the undesirable or dangerous substances; and (3) adsorbing said undesirable or dangerous substances in the device until the device releases the odourant.

34. A device comprising a tube holder having an open end, said tube holder containing a substrate loaded with an odourant selected from the group consisting of crotonaldehyde, cyclohexane, butylamine, diisopropylamine, ethylidenenorborene, triethylamine, isoamylacetate, diisobutylketone, butylene, butylene cellosolveacetate, ethyl mercaptan, butyl mercaptan, ethylene mercaptan and methylcyclohexane, said tube holder being adapted to be incorporated into a gas mask filter or a gas mask.

* * * * *

UNITED STATES PATENT AND TRADEMARK OFFICE
CERTIFICATE OF CORRECTION

PATENT NO. : 5,944,873

DATED : August 31, 1999

INVENTOR(S) : Hein Jager et al.

It is certified that error appears in the above-identified patent and that said Letters Patent is hereby corrected as shown below:

Column 1 Line 42 "adsorption in" should read --adsorption is--.

Column 1 Line 65 "maid" should read --said--.

Column 2 Line 14 "substances in" should read --substances is--.

Column 2 Line 55 "Saratoga carbons" should read --Saratoga carbon--.

Column 2 Line 61 after "By odour" insert --barrier--.

Column 3 Line 25 "shield odourant" should read --shield the odourant--.

Column 5 Line 9 (last line of chart) "substrate" should read --substrate 6--.

Column 5 Line 16 "17, 19, 19" should read --17, 18, 19--.

Column 5 Line 21 "which layer in" should read --which layer is--.

Column 5 Line 55 "not smelling situation." should read --"not smelling" situation.-- (insert quotes).

Column 7 Line 46 "4, 5 and C." should read --4, 5 and 6.--.

Column 9, footnotes under Table 4: after "$t_{-100}$" delete equal sign (=).

Column 10 Line 60 after "Adsorbing" delete colon --:--.

Column 11 Line 24 "Substrate" should read --substrate--.

UNITED STATES PATENT AND TRADEMARK OFFICE

CERTIFICATE OF CORRECTION

PATENT NO. : 5,944,873

DATED : August 31, 1999

INVENTOR(S) : Hein Jager et al.

It is certified that error appears in the above-identified patent and that said Letters Patent is hereby corrected as shown below:

Column 11 Line 24 between "0.23" and "g/g" delete --35--

Column 11 Line 63, claim 1, after "releasing an odour" insert comma --,--.

Signed and Sealed this

Second Day of May, 2000

Attest:

Q. TODD DICKINSON

*Attesting Officer* *Director of Patents and Trademarks*